United States Patent [19]

Meier et al.

[11] 4,150,696

[45] Apr. 24, 1979

[54] ARRANGEMENT FOR SUPPRESSING VIBRATIONS CAUSED BY THE FLOW OF A FLOWABLE MEDIUM

[75] Inventors: Gerd E. A. Meier, Roringen; Winfried Hiller, Göttingen-Nikolausberg, both of Fed. Rep. of Germany

[73] Assignee: Max-Planck-Gesellschaft zur Förderung der Wissenschaften e.V., Göttingen, Fed. Rep. of Germany

[21] Appl. No.: 709,165

[22] Filed: Jul. 26, 1976

Related U.S. Application Data

[63] Continuation of Ser. No. 502,414, Sep. 3, 1974, abandoned.

[30] Foreign Application Priority Data

Mar. 4, 1974 [DE] Fed. Rep. of Germany ....... 2410231

[51] Int. Cl.² .................................................. F15D 1/02
[52] U.S. Cl. ......................................... 138/44; 138/45; 138/46; 251/122
[58] Field of Search ................. 138/46, 37, 39, 45, 138/44; 251/212, 122, 118

[56] References Cited

U.S. PATENT DOCUMENTS

| | | | |
|---|---|---|---|
| 340,696 | 4/1886 | Caldwell | 138/46 |
| 1,063,933 | 6/1913 | Keller | 138/46 |
| 2,270,433 | 1/1942 | Goffredo | 251/212 |
| 2,721,678 | 10/1955 | Gill | 251/212 |
| 2,722,942 | 11/1955 | Hencken | 251/118 |
| 2,744,386 | 5/1956 | Gerwig | 251/118 |
| 2,810,541 | 10/1957 | Thomas | 251/118 |
| 2,936,788 | 5/1960 | Dahl et al. | 138/45 |
| 3,070,345 | 10/1962 | Knecht | 251/212 |
| 3,304,047 | 2/1967 | Martin | 251/118 |
| 3,642,031 | 2/1972 | Wright | 138/45 |
| 4,019,537 | 5/1977 | Bonnard et al. | 138/37 |

*Primary Examiner*—Richard E. Aegerter
*Assistant Examiner*—L. Footland
*Attorney, Agent, or Firm*—Michael J. Striker

[57] ABSTRACT

A flow passage for a flowable medium is bounded by a wall, and located in the flow passage are one or more devices which suppress the occurrence of such flow conditions in the medium as would tend to cause the development of vibrations in the flowable medium and in the walls surrounding the flow passage.

39 Claims, 64 Drawing Figures

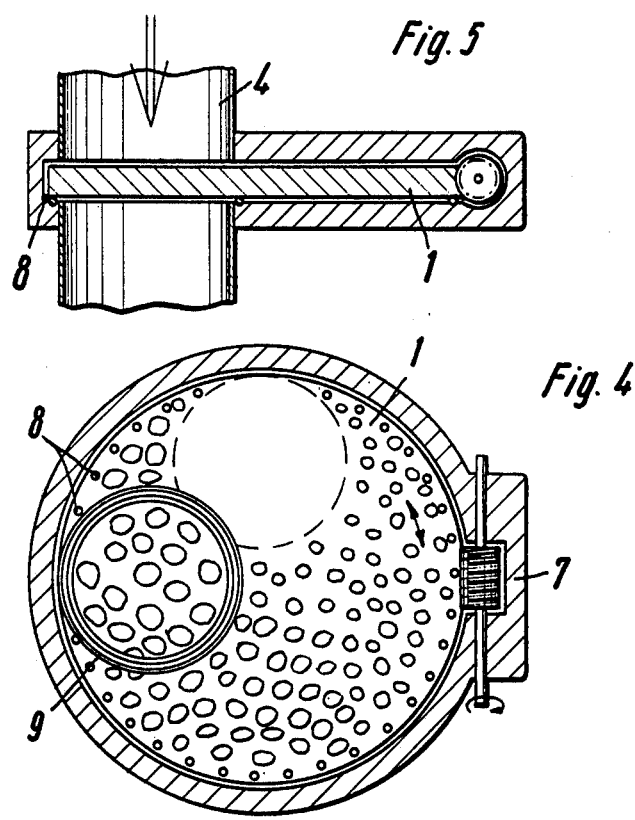
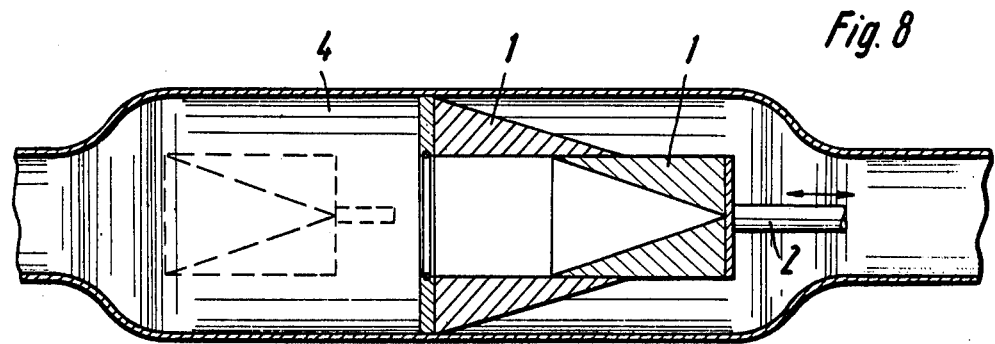

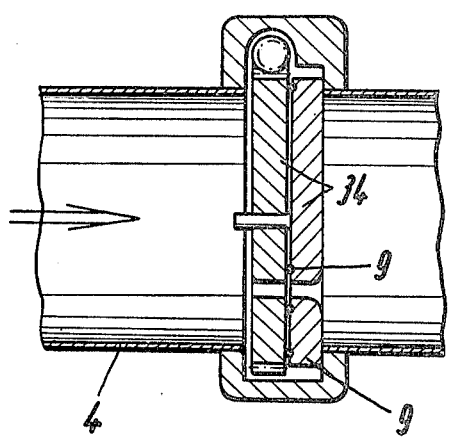
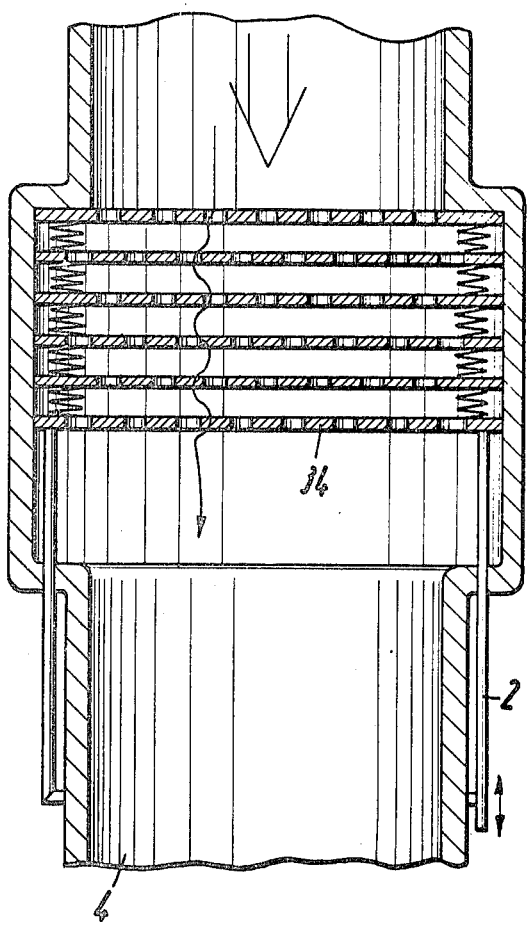
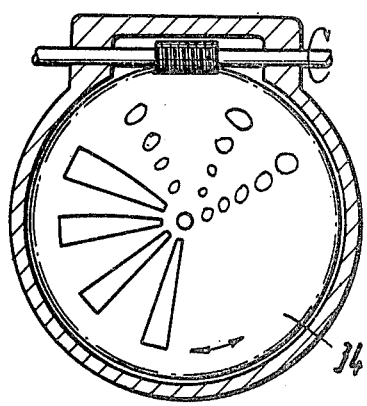
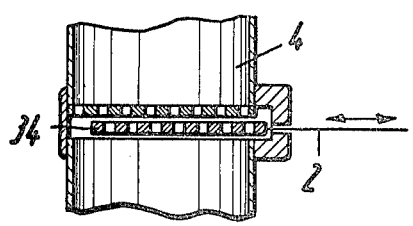
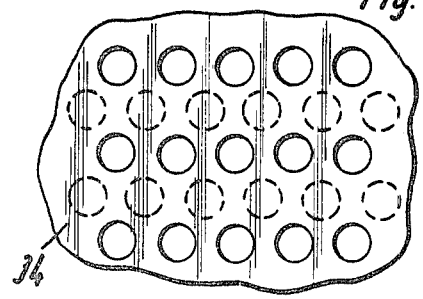
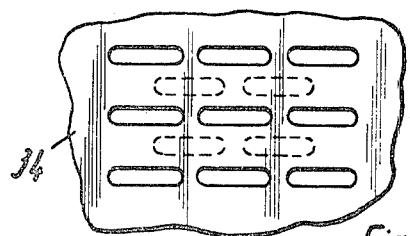

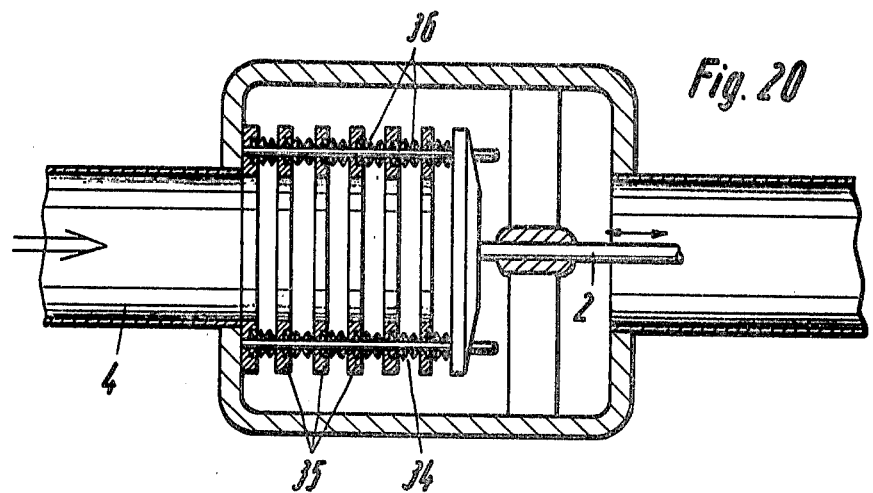
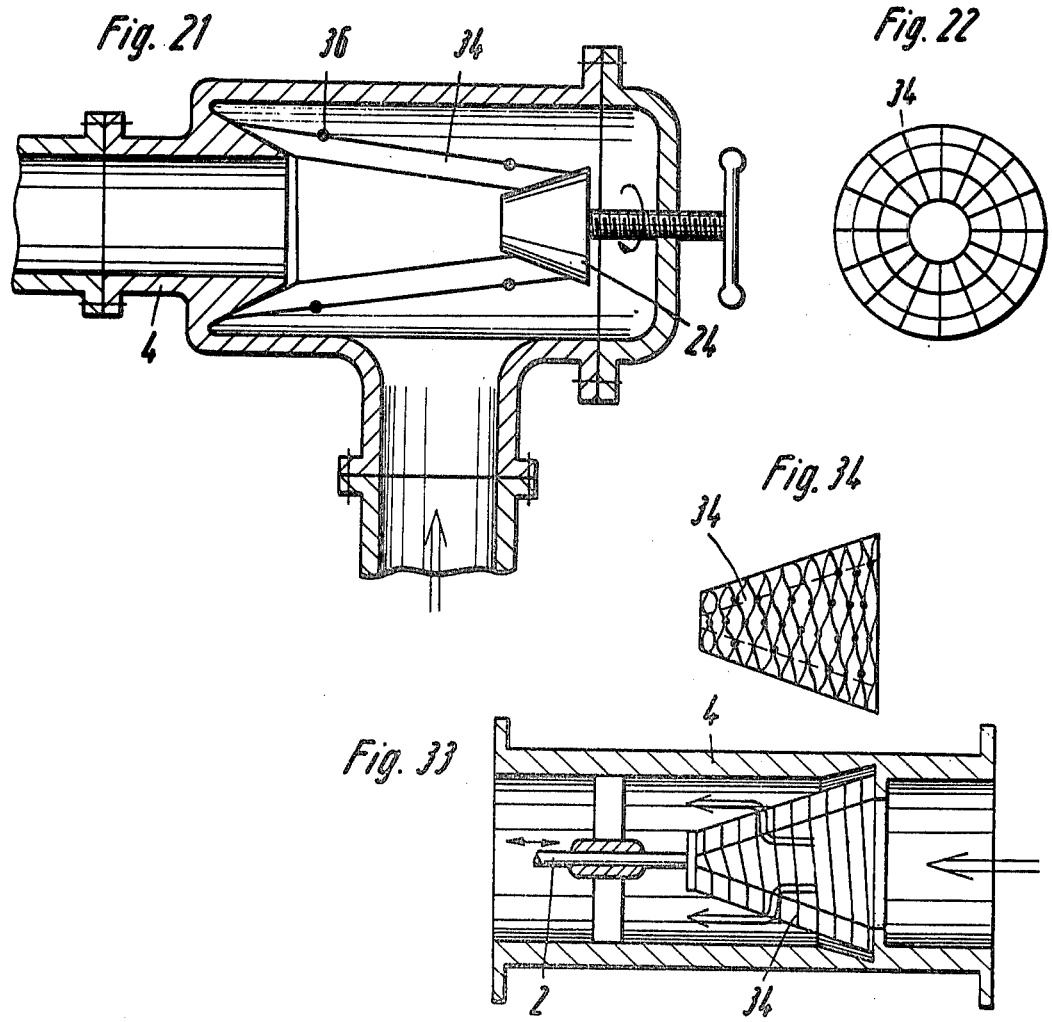

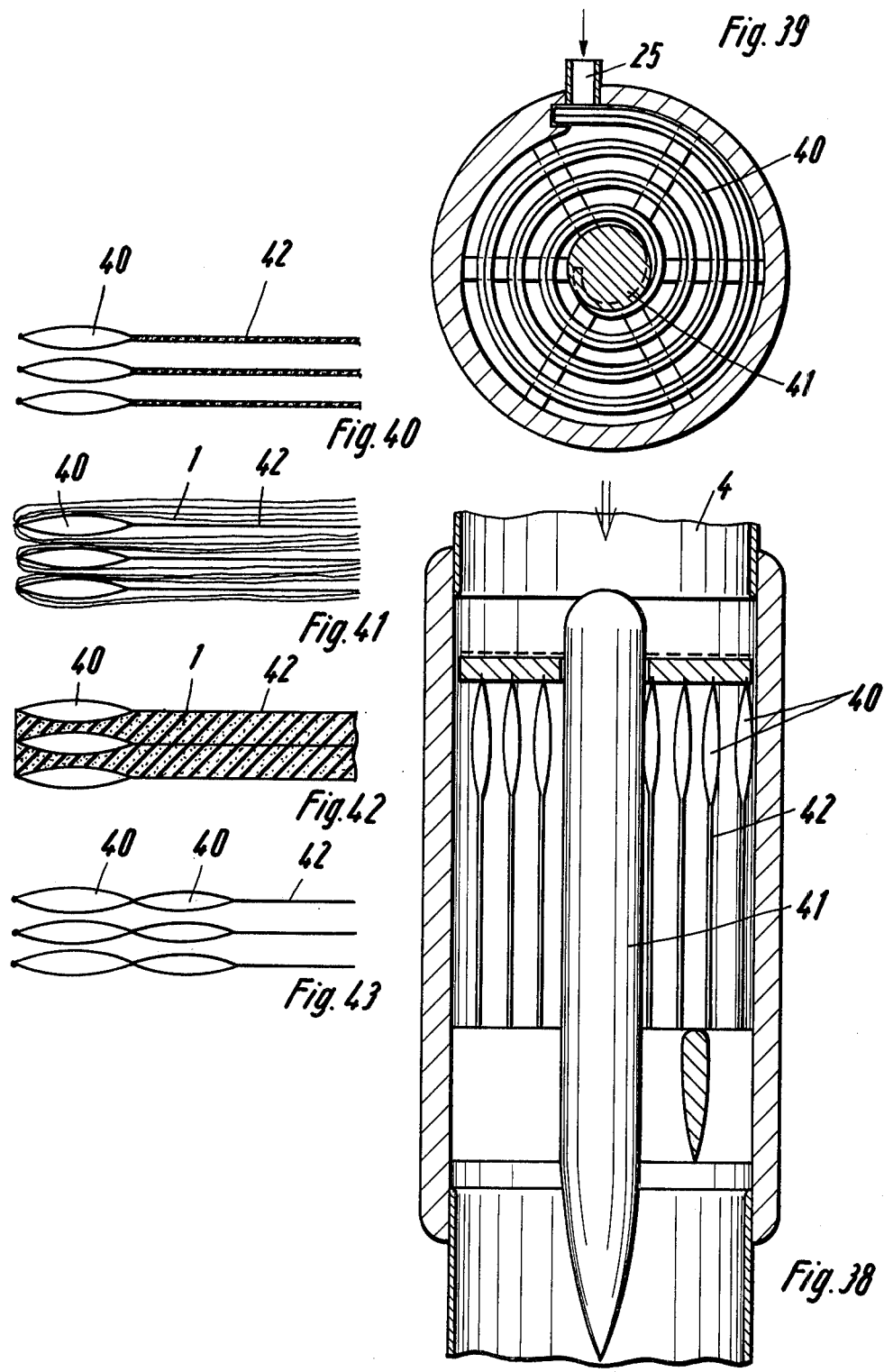

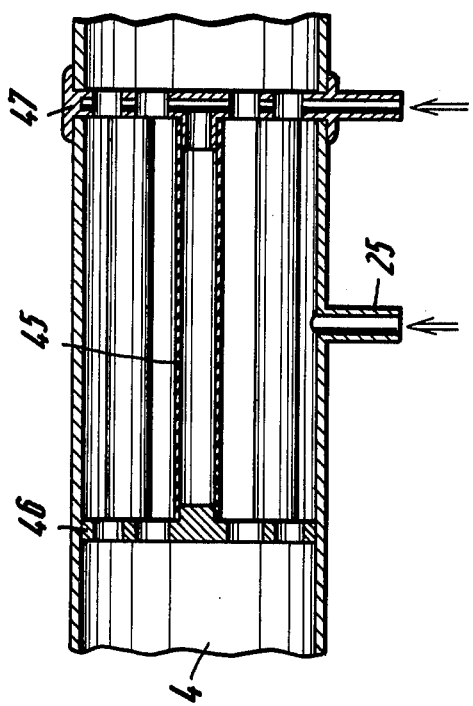
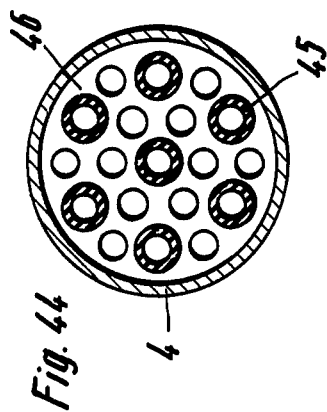
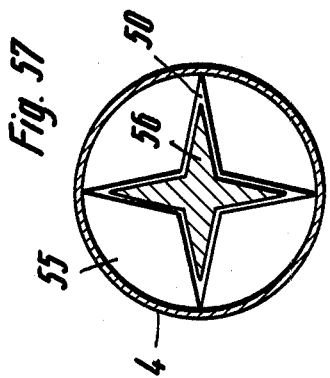
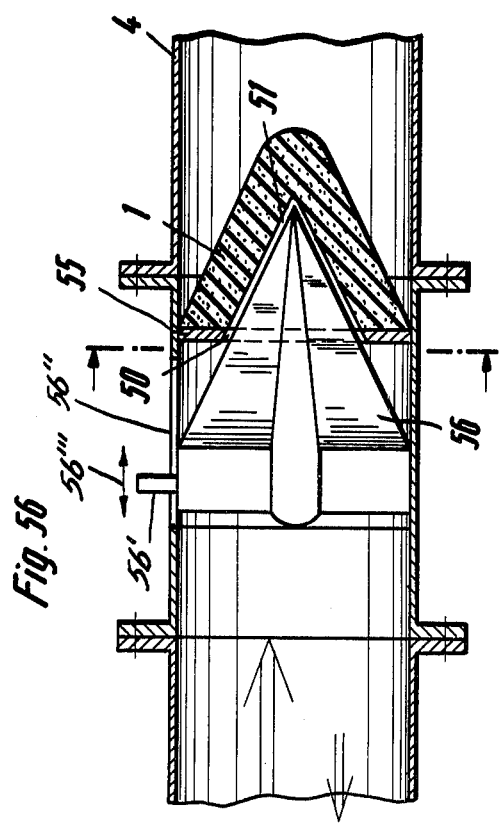

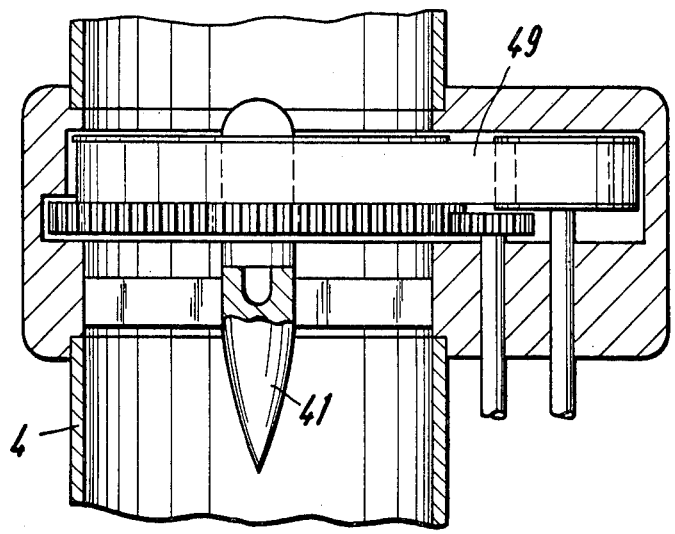
Fig. 47
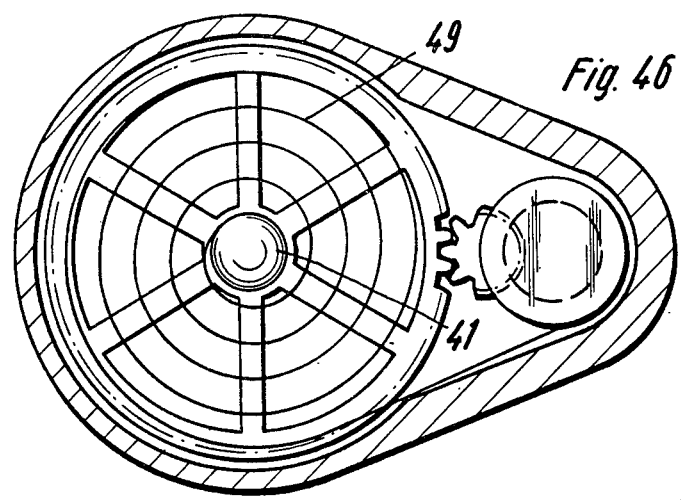
Fig. 46
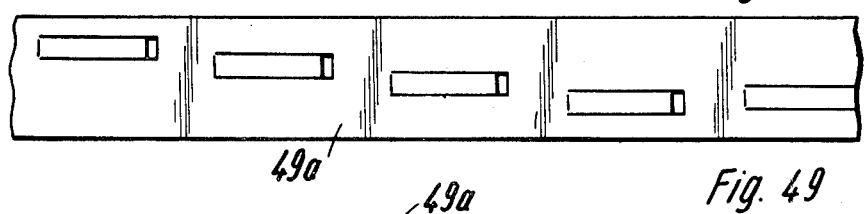
Fig. 48
Fig. 49
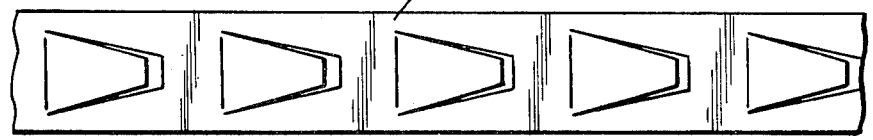
Fig. 50
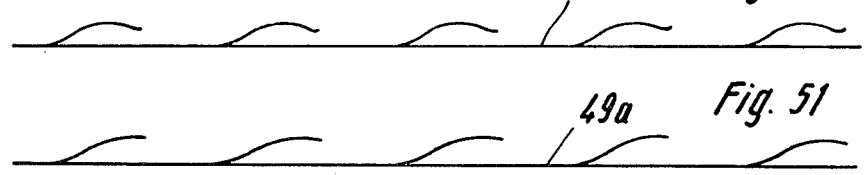
Fig. 51

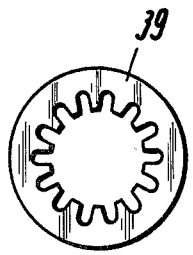
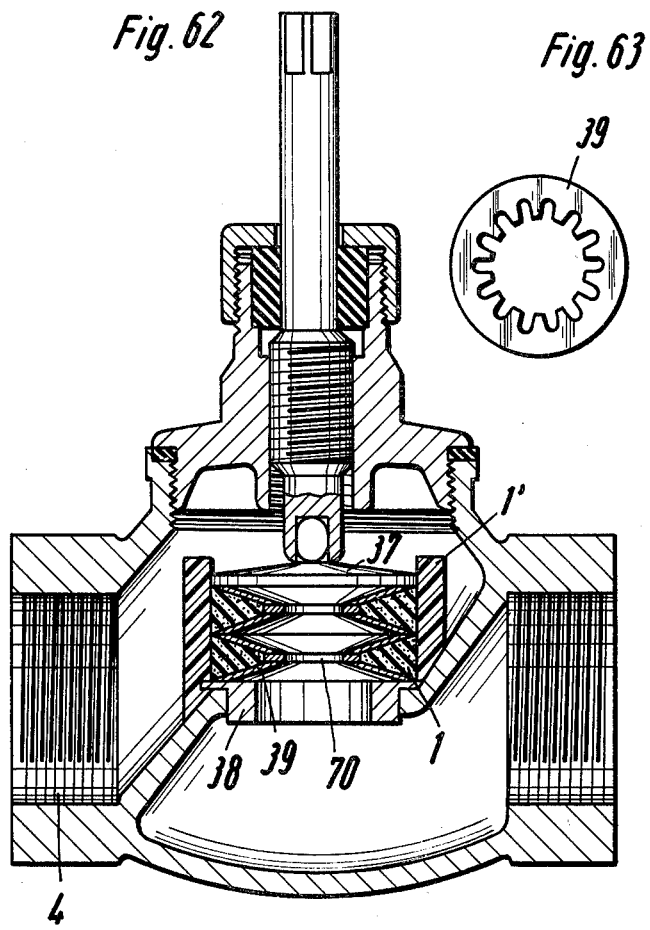
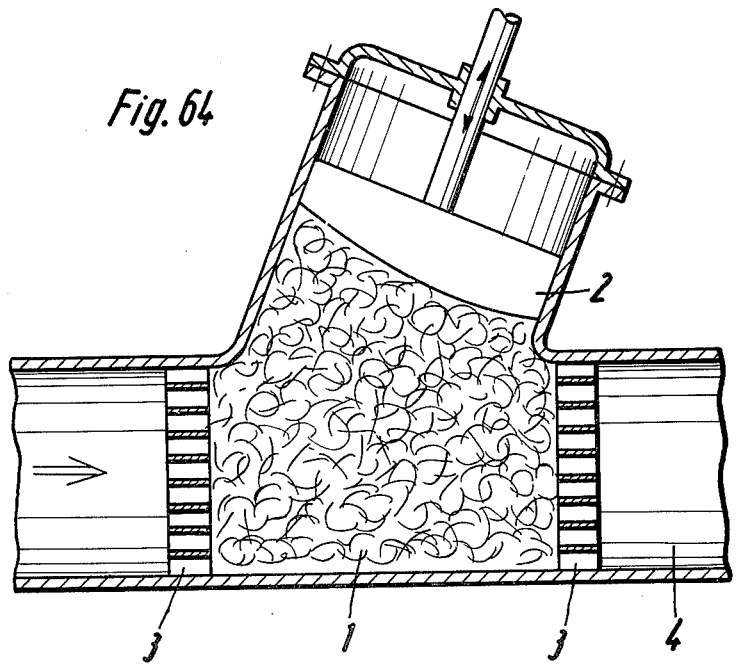

ARRANGEMENT FOR SUPPRESSING VIBRATIONS CAUSED BY THE FLOW OF A FLOWABLE MEDIUM

This is a continuation, of application Ser. No. 502,414, filed Sept. 3, 1974, now abandoned.

BACKGROUND OF THE INVENTION

The present invention relates to a method of and a device for suppressing vibrations in a wall bounding a flow passage and in the medium flowing in said passage which vibrations would result from the flow of a flowable medium through the passage.

The invention is particularly concerned with any type of flow passage-defining arrangement, that is any arrangement wherein a wall or walls bound a flow passage. This includes regulating and throttle valves, slide valves, nozzles and the like. The medium in question may be a compressible medium such as gas, or a non-compressible medium such as a liquid.

It is well known that the flow of a flowable medium through a flow passage results in the development of noise which is frequently objectionable. The prior art has attempted to overcome the problem by providing acoustic insulation which is to dampen the noise. However, in many instances this has not been found to be workable.

The problem therefore continues to exist, and continues to require an effective solution.

SUMMARY OF THE INVENTION

Accordingly, it is a general object of this invention to overcome the aforementioned problems.

More particularly, it is an object of the present invention to eliminate or at least substantially reduce the development of vibrations resulting from the flow of a flowable medium and leading to undesired noise.

A more specific object of the invention is to provide a novel method and arrangement which either prevents the development of such vibrations and noise, or at least substantially reduces them.

In keeping with the above objects, and others which will become apparent hereafter, one feature of the invention resides, in a device of the character in question, in a combination which comprises wall means surrounding and defining a flow passage for a flowable medium, and control means exposed to contact with the medium flowing through the passage and effective for suppressing flow conditions in the medium which tend to cause vibrations.

The invention is based upon the recognition of the fact that so-called non-stationary conditions in the stream of flowing medium are responsible for the development of vibrations, and in particular for noise. If such flow conditions can be eliminated, all side effects resulting from these flow conditions, particularly the excitation of vibrations, development of noise and the like, can similarly be eliminated. The most important non-stationary flow conditions are turbulence in boundary layers of the flow and in homogenous flow fields, or on free surfaces of the flowing medium, cavitation in the case of flowing liquids, and controlled flow instability, that is fluctuation and vibration conditions which result from control or other devices which are arranged in or adjacent the flow path. These latter types of instability are mostly dependent for their development upon the presence of free boundary layers—such as surface waves or the like—or other inhomogeneities in the field of flowing medium. In the case of cavitation, especially cavitation which occurs in the vicinity of a wall bounding the flow passage, there will be a development not only of noise, but also of noise-creating secondary effects, particularly instability and fluctuating movements of the liquid particles in the free surfaces at the vapor bubble and the development of pressure waves which result when free liquid surfaces impinge upon one another.

The invention proposes three basic approaches to deal with the problem at hand. According to one aspect, the invention proposes to provide mechanical structures, such as throttle devices or the like, which come in contact with the flowing medium, of such dimensions that for these structures the Reynolds number is as small as possible. The Reynolds number of a flow of flowable medium is defined as the product of a scale velocity and a scale length divided by the kinematic viscosity of the flowable medium. This number in this case is determined by the flow speed of the medium in the mechanical structure, the dimensioning of the structure which is characteristic for the flow or the dimensioning of the flow channel formed in the structure, and the kinematic viscosity of the flowable medium. If a small Reynolds number can be obtained, it is possible to obtain laminar flow conditions of the medium that flows through the structure, and to produce in the structure a flow resistance resulting from a viscous flow of the medium through the structure. This viscous flow is characterized in that non-stationary flow conditions cannot develop as the medium flows through the structure, so that the development of noise does not occur. The Reynolds number should advantageously be on the order of 1, but even in the event of higher values—for example on the order of 100 or even 1000—it is still possible to effectively reduce or eliminate undesired flow noises.

If the medium flow in the flow passage, for instance in a certain portion of a fluid machine, reaches a high Reynolds number so that the flow begins to become turbulent, the aforementioned principle of imparting to the medium a low Reynolds number can be applied in that the medium flowing at a high Reynolds number—e.g. a free-flowing stream of the medium or a rapidly-flowing stream of the medium in a channel—is brought in contact with structures which, when the medium flows around them, will impart to the medium a low Reynolds number. By an appropriate arrangement and configuration of such structure or structures it is possible to impart to the fluid a viscosity of flow which substantially dampens the development of turbulence or, if turbulent fields have already been produced, tends to eliminate these. In such a case an increased flow resistance for the basic flow must be accepted, but it has been found that in many instances an elimination of the turbulence can be achieved by resorting to the present invention, without having to accept any really significant increase in the flow resistance.

If a flow of medium travels through a conduit and a small flow resistance is to be obtained, then it is for instance possible to use a sufficiently thin wire of cylindrical cross section which extends transversely to the direction of flow. The wire dimension which is characteristic for obtaining the desired Reynolds number is the diameter of the wire. To regulate and increase the flow resistance which is introduced into the flow, the number of wires employed can be increased as desired. The Reynolds number resulting from the wire diameter and the flow speed of the medium in the region of the wire or wires, can be selected as desired by appropriate measures, such as by appropriate arrangement of the wires over the cross section of the flow passage, or by increasing the wire cross section. When a throttling condition is obtained at which the spacing of the wires from one another is smaller than their diameter, then the Reynolds number is determined by the width of the flow channels which remain between the individual wires. An extreme case of very high flow resistance with a viscous laminar flow would be obtained if a fibrous sliver is utilized which is mounted in the flow-through cross section of the flow passage.

By employing the above enunciated principle of the small Reynolds number in the case of flowing liquids, the development of cavitation in most instances can also be eliminated because high flow speeds, which lead to a decrease of the static pressure below that of the outflowing liquid, are reliably avoided. This eliminates the development of vibrations and noise due to cavitation which is caused by the non-stationary disintegration of the cavitation bubbles.

A further approach proposed by the invention to solving the vibration and noise problem outlined earlier, is to eliminate circumstances in the flow passage which could lead to a non-uniform change of a flow condition, because such conditions cause instabilities in the behaviour of the flowing medium. In the case of throttling devices through which the medium flows, fluctuation in the flow conditions can be avoided primarily by avoiding sudden fluctuations in the speed of the medium. The aforementioned principle of the small Reynolds number actually does eliminate the problem here under discussion, but there are circumstances where it is necessary to suppress certain fluctuations in the flow conditions of the flowing medium even at higher Reynolds numbers. In such a case, the desired effect can be achieved by appropriate configuration of the flow channels in the throttling device or the like, for example by making sure that the pressure increase in the flowing medium which is used to prevent lifting-off of the medium boundary layer, has only very small values, or that for example the boundary layer or even the entire flow of medium is subjected to a suction effect of a separate medium used for this purpose and which operates in the region of the aforementioned smaller Reynolds numbers.

The free liquid surface which develops during cavitation causes, when it deteriorates, strong flow noises due to turbulence and the impingement of free liquid surfaces. The principles outlined above to avoid sudden changes in the flow conditions of the medium are therefore to a certain extent also suitable for suppressing the occurrence of cavitation. For example, the development of excessively high flow speeds and angles at which the medium must change its flow direction, should be avoided in throttling elements.

Still another concept of the invention suggests that undesired vibrations or noises might be avoided by shifting the frequency into a higher or sometimes into a lower range by appropriately changing the characteristic dimensioning of the structures which are responsible for the development of the vibration or noise in the first place. If a part of the noise is produced outside the audible range, then it is not found disturbing. Furthermore, in the audible range the sensitivity of the ear decreases from the mid-frequency range towards the higher and lower frequency ranges. A shifting of the undesired frequencies towards a higher frequency range will as a rule make it possible to eliminate the exitation of mechanical resonance in the walls bounding the passage, as a rule higher vibratory and audio frequencies inherently tend to undergo an improved damping effect without requiring special measures, usually within the structure forming the flow passage. Also, the volume and therefore the total generation of noise can often be decreased by decreasing a dimension of the structure wherein the noise is being produced.

The vibration and noise produced by non-stationary flows is proportional to the volume of the non-stationary flow, assuming an appropriate selection of analogy parameters. The frequencies at which the fluctuation movements result in the development of the vibration and noise are inversely proportional to a characteristic dimension of the non-stationary flow range. This means that in the case of throttling devices the reduction of the characteristic dimensions of the non-stationary flow range by subdividing the main flow into small individual flows, can be used to reduce the total mount of vibration and noise that originates in the flow and at the same time to shift it into the range of higher frequencies which may not be audible and which are not suitable for producing noise in the wall bounding the flow passage. Such a subdivision of the flow range or main flow into a plurality of individual secondary flows shifts the frequencies produced into a higher frequency range, whereas the development of low frequencies—which would result if the secondary streams were produced in the free atmosphere—is largely avoided by the presence of the surrounding wall. By increasing the characteristic dimensions of the non-stationary flow range the frequencies produced can be shifted to lower and less objectionable frequencies, but in this case an increase of the range in which vribration and noise is produced, must be accepted. By subdividing the flow into individual small branches a shielding effect of the branches upon one another is obtained, whereby frequently the production of vibrations and noise is prevented even more effectively than by shifting the noise frequencies. It has also been found that in many instances the change in the configuration of the flow stream makes it possible to avoid the necessity for shifting towards different frequencies of the range.

The invention is equally well suitable for producing noises originating from a flow of gases or from a flow of liquids. By employing the invention, the amount of noise that is produced can be reduced to a tenth or even to a thousandth of that which is produced without the invention, making only minor changes in known devices having flow passages wherein such noise is produced. Moreover, the present invention makes it possible to provide for a noiseless or low-noise operation of flow devices, such as throttling devices which are adjustable, even under variable flow conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 4 is a cross section through a device according to the invention;

FIG. 5 is another section through the device of FIG. 4;

FIG. 8 is a diagrammatic axial section through another device of the invention;

FIG. 14 is a fragmentary detail view, illustrating a detail of another embodiment of the invention;

FIGS. 15 and 16 are two sectional views, illustrating a further embodiment of the invention;

FIGS. 17, 18 and 19 are views showing an additional embodiment of the invention;

FIG. 20 shows another embodiment of the invention;

FIGS. 21 and 22 are somewhat diagrammatic views, FIG. 21 in section, showing a further embodiment of the invention;

FIG. 33 is an axial section, illustrating another embodiment of the invention;

FIG. 34 is a somewhat diagrammatic side view, showing a structure that can be used in the embodiment of FIG. 33;

FIG. 38 is a fragmentary axial section through another embodiment of the invention;

FIG. 39 is a cross section of FIG. 38;

FIGS. 40–43 are fragmentary diagrammatic sections, illustrating details of structures that can be used in the embodiment of FIGS. 38 and 39;

FIG. 44 is a cross section of FIG. 45;

FIG. 45 illustrates in fragmentary axial section a further embodiment of the invention;

FIG. 46 is a cross section through FIG. 47;

FIG. 47 is a fragmentary axial section through a further embodiment of the invention;

FIGS. 48–51 are fragmentary detail views, showing details of structures that can be used in FIGS. 46 and 47;

FIG. 56 illustrates a further embodiment of the invention in fragmentary axial section;

FIG. 57 is a cross section through FIG. 56;

FIG. 62 is an axial section showing a further embodiment of the invention;

FIG. 63 is a plan view showing a detail of one of the components in FIG. 62; and FIG. 64 is an axial section showing still another embodiment of the invention.

DESCRIPTION OF THE PREFERRED EMBODIMENTS

Before referring to the individual Figures in detail it is recalled once again that the invention provides for three basic approaches to the solution of the problem in question. One of these is to impart to the flowing stream of medium a small Reynolds number. FIGS. 1–12 and 62–64 show embodiments which are particularly concerned with this aspect of the invention.

Figure 13:
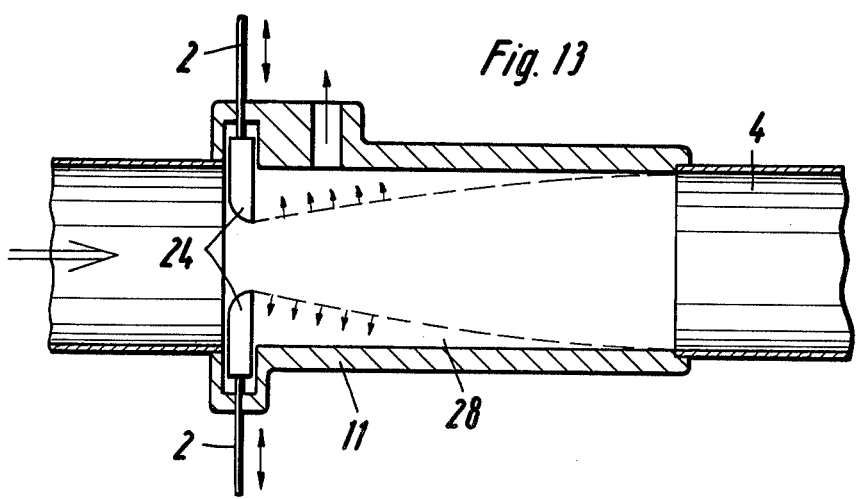
FIG. 13 is a diagrammatic axial section, showing another embodiment of the invention.

A further concept of the invention seeks to solve the problem by eliminating sudden fluctuations in the flow condition of the flowing stream of medium. FIG. 13 shows an embodiment of the invention which utilizes this concept and which will serve to explain the concept.

Still another concept involves the solution to the problem at hand by splitting the main flow of medium into a plurality of individual secondary or branch flows. FIGS. 14–16 and 20–35 illustrate embodiments directed to this concept.

Finally, FIGS. 17–19 and 36–61 illustrate embodiments wherein two or more of the concepts are combined in a respective embodiment.

In all of the Figures, the mechanical structure causing a small Reynolds number in the stream of flowing medium, is identified with reference numeral 1. In all of the Figures a mechanical structure which splits the stream of flowing medium into a plurality of branch streams is identified with reference numeral 34.

Coming now to a detailed description of the drawing it is pointed out that FIGS. 1–10 show by way of example various embodiments in which the full flow-through cross section of the flow passage remains unchanged in the throttling region. These embodiments have the advantage that in case of non-compressible media, such as liquids, the flow speed will not be significantly changed anywhere, and that in the case of compressible media there will be a constant and monotonous accommodation of the inlet flow condition to the outlet flow condition.

Figure 2:
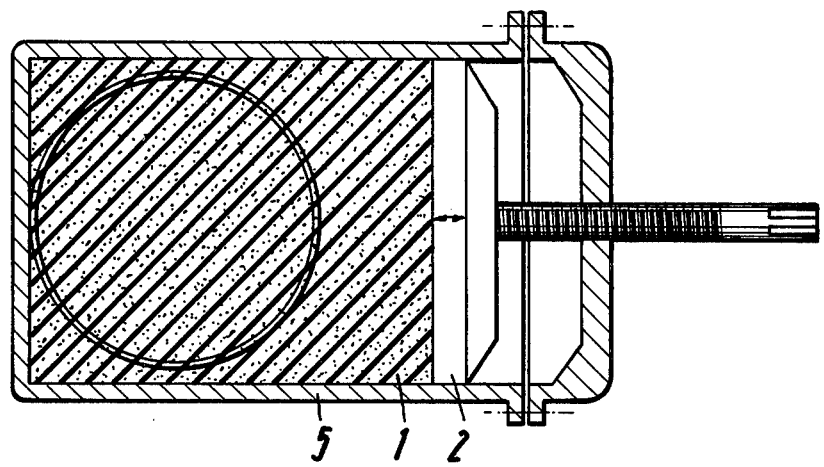
FIG. 2 is another axial section through the same device.
Figure 1:
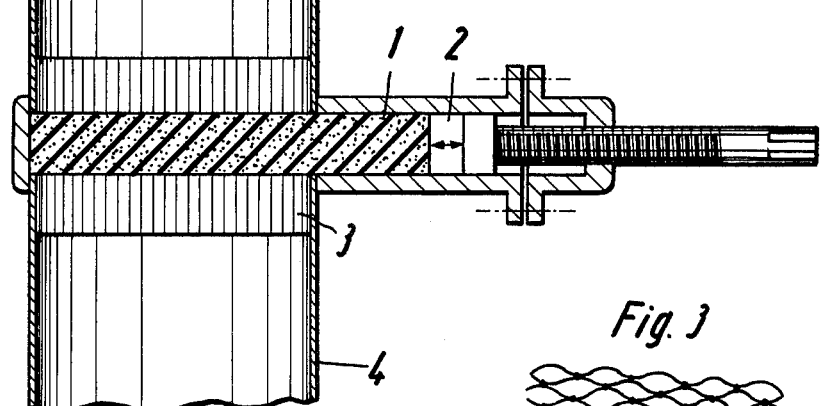
FIG. 1 is an axial section through a device according to one embodiment of the invention.

When there is a constant resistance volume in FIGS. 1 and 2, the resistance can be varied in order to regulate the flow by utilizing a porous but compressible structure 1 which causes a low Reynolds number, which can be compressed by a pressure-exerting instrumentality 2, so that flow channels present in the porous structure 1 can have different widths, depending upon the extent of pressure exerted by the instrumentality 2. If the elements of the structure 1, such as the channels defined in the same, are sufficiently small, than for all desired flow speeds the principle of the small Reynolds number can be assured. In FIGS. 1 and 2 reference numeral 4 identifies a tube or conduit through which the medium flows. The tube 4 is interrupted by a chamber 5 which in this embodiment is of rectangular outline and in which a plate-shaped resistance structure 1 (see FIG. 1) is accommodated (compare also FIG. 2). The structure 1 extends across the tube 4 and can be compressed to a selectable extent by means of a pressure-exerting device 2 which is guided in the chamber 5 and can be actuated by the outwardly extending plunger 1. The structure 1 tends to resist compression and, when the compressive force is removed, to return to its original position. Therefore, depending upon the extent of pressure exerted, the flow channels in the structure 1 can have a greater or a smaller diameter. At opposite sides of the structure 1 there are provided supports 3 which engage the structure 1 and assure that it will have a constant thickness, that is that it cannot yield to pressure by bulging in axial direction of the tube 4. Advantageously, the supports 3 are grids or similar devices, for instance elements having a plurality of parallel slots in them or the like, so that the liquid can pass through them. These elements may be of metal or synthetic plastic material.

Figure 3:
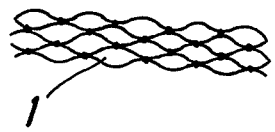
FIG. 3 is a diagrammatic fragmentary view illustrating a structure according to the invention.

The structure 1 may be of various different materials, for instance hair felt, rubber balls, open-celled synthetic plastic foam material or other analogous structures, or it may be in form of a plate-shaped stack of springy elements such as alternately arranged smooth and corrugated strips of metal or plastic, or grids of thin connected strips of sheet metal or sheet plastic which are corrugated to have the configuration shown in FIG. 3 so as to form flow-through channels. Advantageously, whatever type of material is selected for the structure 1, it should be such that when the pressure-exerting device 2 has been shifted inwardly of the chamber 5 until it reaches the cross section of the tube 4, the pores or flow passages of the structure 1 are squeezed completely closed. The supports 3 can be omitted if the structure 1 is of a such character that bulging or yielding axially of the tube 4 need not be feared.

The structure 1 of FIG. 3 commends itself especially for the intended purpose. To produce the structure 1 of FIG. 3, smooth strips of sheet metal or synthetic plastic are connected at the points indicated by dots in FIG. 3. Of course, wires could also be used for this purpose. In operation, the flow-through cross section of the passages will be varied depending upon the pressure exerted by the device 2. It goes without saying that it is also conceivable to connect the structure 1 firmly to the tube 4, for instance in FIG. 1 at the left-hand side of the tube, and to connect the right-hand end of the structure 1 to the device 2 so that the latter can be used not only to exert pressure upon the structure 1, but also to exert pull upon the structure 1 when the device 2 is moved towards the right.

A further embodiment of the invention is illustrated in FIGS. 4 and 5. Here, the structure 1 is of circular outline and has flow channels formed in it which are distributed over its surface area and which have different dimensions capable of producing a small Reynolds-number flow. It is possible to use materials having differential porosity over their surface area, apertured structures with apertures of different cross-sectional area with different aperture densities in different portions of the structure, screens, sieves or the like. The periphery of the circular structure 1 is formed with teeth which are engaged by a worm 7 that can be rotated in order to thereby turn the structure 1 which is located eccentric with reference to the passage or pipe 9, so as to be able to bring regions having different density of aperture or apertures of different cross-sectional areas selectively into the interior of the pipe 9 (see FIG. 5). One portion of the structure 1 may be provided with a cutout corresponding to the inner diameter of the pipe 9 (compare FIG. 4), so that the inner diameter of the pipe 9 can be made completely unobstructed by locating this portion appropriately, if and when it is desired not to employ the action of the structure 1. The forces exerted upon the structure 1 by the flowing medium can be absorbed in appropriate manner, for instance by supporting the downstream side of the structure 1 via bearing balls or bearing rollers 8. The gap between the structure and the housing surrounding it can be sealed by an annular seal at the downstream side.

Figure 7:
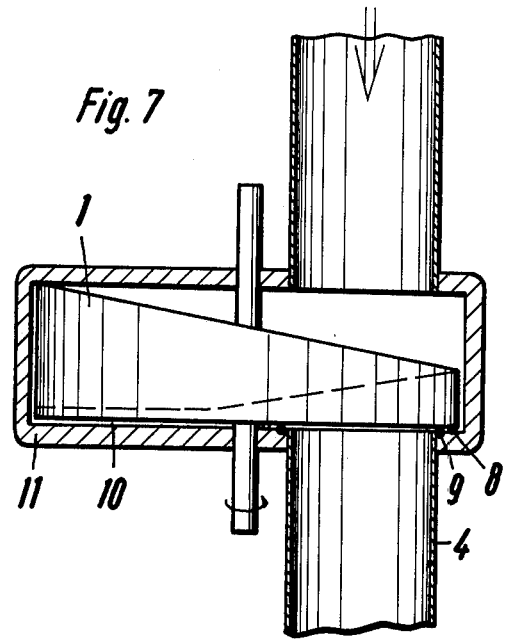
FIG. 7 is a further section through the device of FIG. 6.
Figure 6:
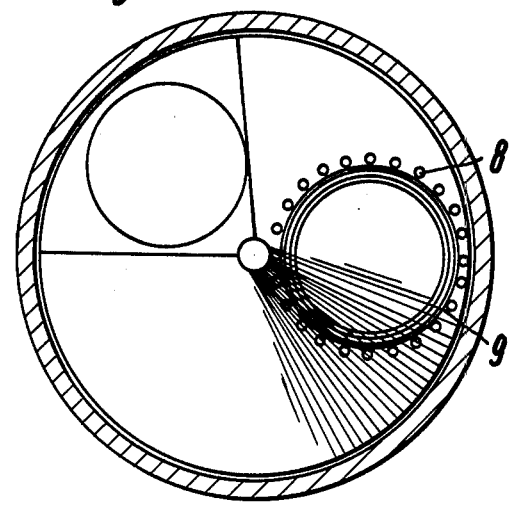
FIG. 6 is a cross section through a further device according to the invention.

FIGS. 6 and 7 show a further embodiment of the invention in which the full cross section of the pipe 4 is available but the throttling resistance is variable. The structure 1 here is again in form of a circular member which is mounted eccentrically with reference to the cross section of the pipe 4 and is turnably supported in a housing 11. One end face of the circular structure 1 is helically curved so that by turning the structure 1 about the axis indicated by the shaft on which it is turnable, the effective thickness of the structure 1 which becomes located in the interior of the pipe 4 and through which the medium must flow, can be varied. In effect, the structure is wedge-shaped (compare FIG. 7) and this configuration permits in particular the use of a homogenous material having a small Reynolds number. The helically shaped end face of the structure 1 can have a variable curvature or be otherwise contoured to obtain a desired effect upon the flowing medium. The support and sealing of the structure 1 is analogous to the arrangement in FIGS. 4 and 5. However, in FIGS. 6 and 7 the bearing elements 8 are located not along the outer periphery of the structure 1, but surround the pipe 4. A gap exists between the housing 11 and the downstream end face of the structure 1 to permit an inflow of the flowable medium for pressure equalization purposes. Such a gap can also be provided in FIGS. 4 and 5 if desired.

A change in the effective thickness of the structure through which the fluid must pass, can also be obtained by providing several plates which are spaced behind one another in the direction of flow of the medium, and which can be selectively inserted into the pipe 4. The plates can then have different thicknesses and different specific flow resistances. By providing a different structure across the entire surface area of the respective plates, and by inserting the different plates to different extents across the cross section of the pipe 4, the possibilities of regulation are extremely versatile.

FIG. 8 illustrates an embodiment wherein two annular structures 1 of wedge-like cross section are arranged so that their axis corresponds to the longitudinal axis of the pipe in which they are mounted. The structures 1 can be shifted relative to one another in telescopic manner. The outer circumferential surface of the outer structure 1, and the inner circumferential surface of the inner structure 1 are conically tapered, whereas the inner circumferential surface of the outer structure 1 and the outer circumferential surface of the inner structure 1 are cylindrical. At the end faces of the two structures 1 which face away from one another the permeable structures are each covered by an end plate. When the two structures are shifted relative to one another in axial direction, by moving the illustrated rod in the direction of the double-headed arrow, until the aforementioned plates are located in a common plane, then the flow-through cross section is completely blocked. When the inner structure 1 is shifted relative to the outer structure 1 to the position shown in broken lines (the plate at the left-hand end of the outer structure 1 has of course an opening corresponding to the passage in the structure 1 so that fluid can flow through) then the full flow-through cross section corresponding to the passage in the outer structure 1 is available. Depending upon how far the two structures 1 overlap, greater or lesser throttling resistances can be obtained. The structures 1 could also be made rotatable relative to one another or different structural characteristics could be provided along the circumferences of the two structures.

Figure 9:
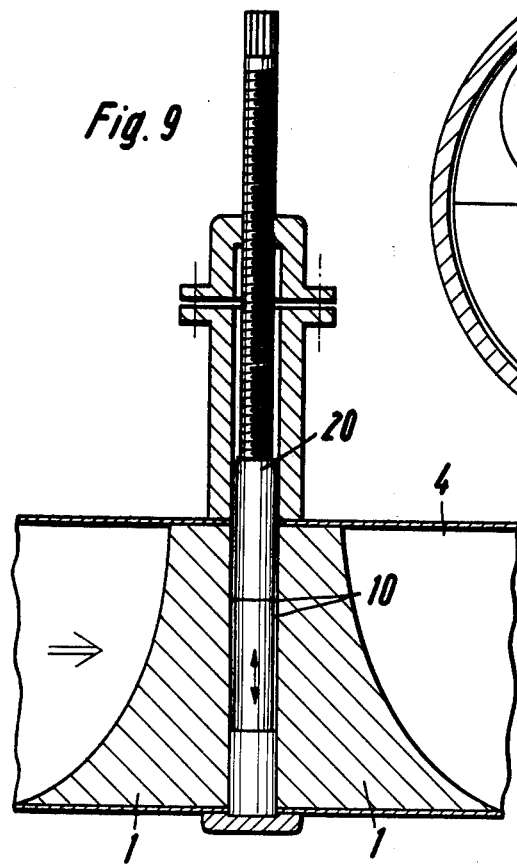
FIG. 9 is a fragmentary sectional detail view of FIG. 8.

FIG. 9 shows an embodiment of the invention in form of a throttling member which is accommodated in a pipe 4 and by which the movement of a plate-like valve member 20 opens a greater or lesser flow-through cross section in the structure 1 which is located ahead of and/or behind the gap in which the member 20 moves. It is important for the proper operation that the gap 10 between the member 20 and the structure 1 is small, so that no significant flow of medium can take place in it, because otherwise the possibility of regulating the desired resistance would be strongly limited. The thickness of the structure 1 ahead of and behind the plate 20 increases in such a manner that in the case of small openings resulting from a withdrawal of the member 20 out of the pipe 4 to a small extent, a greater thickness of the structures 1 must be traversed by the flowing medium than if the member 20 has been withdrawn to a greater extent from the pipe 4. In this manner an increase of the entrance speed, which necessarily leads to an increase in the Reynolds number in the structure, can be avoided for the region of the small openings mentioned above. FIG. 9 could be modified by having both of the structures 1 of constant thickness over the entire cross section of the pipe 4, and the structure 1 which is located ahead of the member 20, that is the upstream structure 1, could also be omitted.

Figure 10:
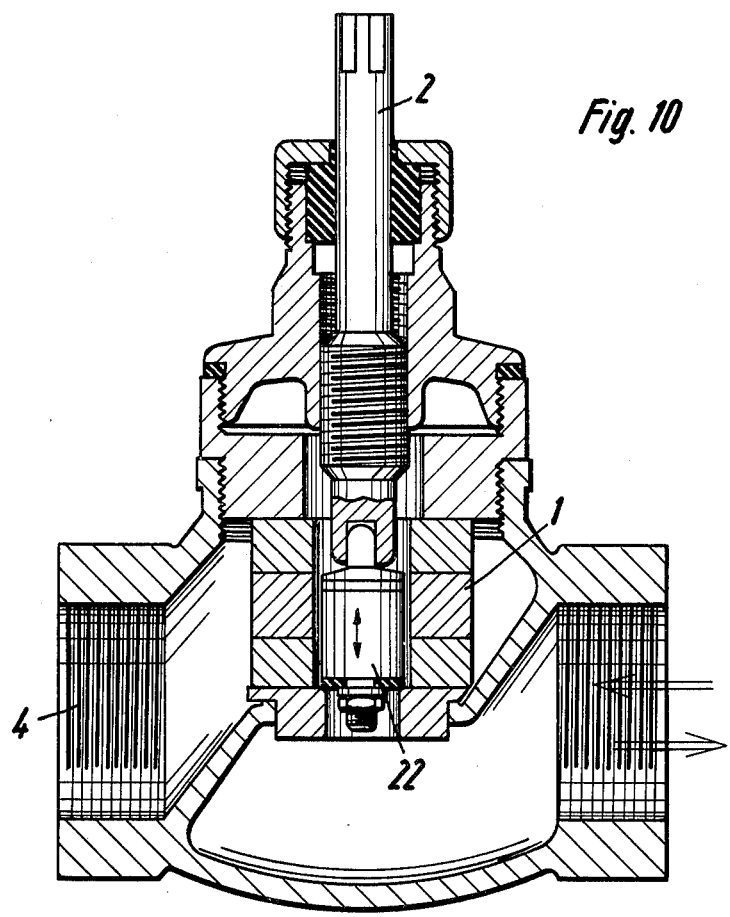
FIG. 10 is an axial section through a valve embodying the invention.

FIG. 10 shows a rather conventional plate valve which is slightly modified by incorporating the present invention in it. The valve seat here has rings of sinter material stacked upon it, and these serve as structures 1 offering the desired small Reynolds number. The valve member is replaced by a piston 22 which is guided in the center of the rings 1. A sinter material is particularly suitable in this embodiment for the structures 1, because due to the fine grain of the sinter material the desired small Reynolds number can be readily obtained.

The valve shown in FIG. 10 was tested, and in particular a flow of air was passed through it and the noises developing in the valve were measured with a condenser microphone. It was found that over the entire frequency range a marked reduction in the noise level was observed as opposed to the same valve in a conventional construction, that is not modified according to the invention. A stepping up in the characteristic of the structure 1 is obtained in the valve of FIG. 10 in that the stacked rings 1 are of sinter material having different specific flow resistances. The rings 1 are so arranged that in case of small valve openings the materials of larger flow resistance become effective. The structures 1 are firmly mounted on the valve seat and depending upon its position the piston 22 exposes different cylindrical surfaces for the flow of the medium. In the closure position the piston 22 engages with a seal provided at its lower end face against the valve seat, thus completely sealing the valve. The valve of FIG. 10 can be used for a flow of medium in either one or the opposite direction, as indicated by the two arrows. The sinter materials used for the structures 1 could be replaced with other materials, for instance with fibrous sliver of synthetic plastic material or of metal filaments, or a layering of prismatic, thread-like or otherwise configurated bodies. Of course, under all conditions the small Reynolds number requirement must be maintained.

Figure 11:
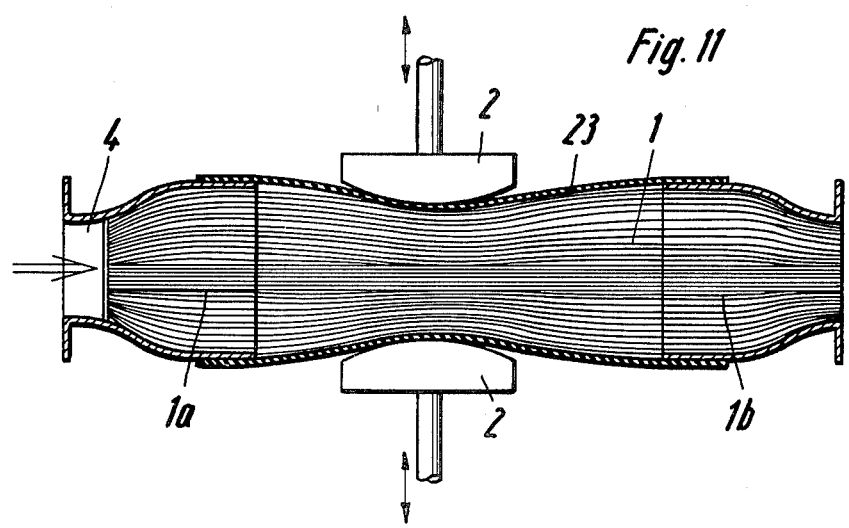
FIG. 11 is a somewhat diagrammatic axial section illustrating a further embodiment of the invention.

The embodiment of FIG. 11 shows two pipe sections 1a, 1b which are connected by means of an elastically compressible hose 23. Accommodated in the hose are structures 1 offering the desired small Reynolds number, such as wires, fiber or cellular structures, or threads extending in the flow direction. These are compressed by compressing the hose 23 from the exterior by means of the pressure-exerting device 2, to decrease the flow passages of the structures 1 so as to vary the flow resistance between a value which depends on the type and characteristics of the structure 1 in the non-compressed condition, to very high values, and the regulation can be carried out continuously depending upon the extent to which the hose 23 is compressed. The structure 1 in FIG. 11 may in the non-compressed condition have a cross section which is larger than the inner cross section of the inlet pipe section 1a. In this case the regulating cross section can be made larger than the inlet cross section as long as no compression is exerted upon the hose 23, thereby assuring that in cases at which high flow speeds already obtain in the pipe section 1a, the flow speeds in the throttling structure itself can be decreased so that the requirement of obtaining the small Reynolds number can be more readily met. This possibility of course can be used in the various other embodiments also.

To eliminate unstable flow conditions the structure 1 can extend into the pipe section 1a to obtain a smoother transition and assure that due to the pressure increase which takes place in the structure 1 and the viscous flow of the medium through the elements of the structure 1, unstable flow conditions cannot develop or, if present, will be dampened. The structure 1 can also extend into the downstream pipe section 1b where the latter converges, in order to eliminate differences at the point of transition. The device 2 can utilize hydraulic or pneumatic pressure-exerting devices which in many instances can be controlled by the flowing medium itself. Of course, the hose 23 could also be the inner wall of a double-walled tube, the outer wall of which is not deformable, and a hydraulic or pneumatic pressure medium of variable pressure could be admitted into the space between the inner and outer walls to thereby inwardly compress the inner wall constituted by the tube 23.

Figure 12:
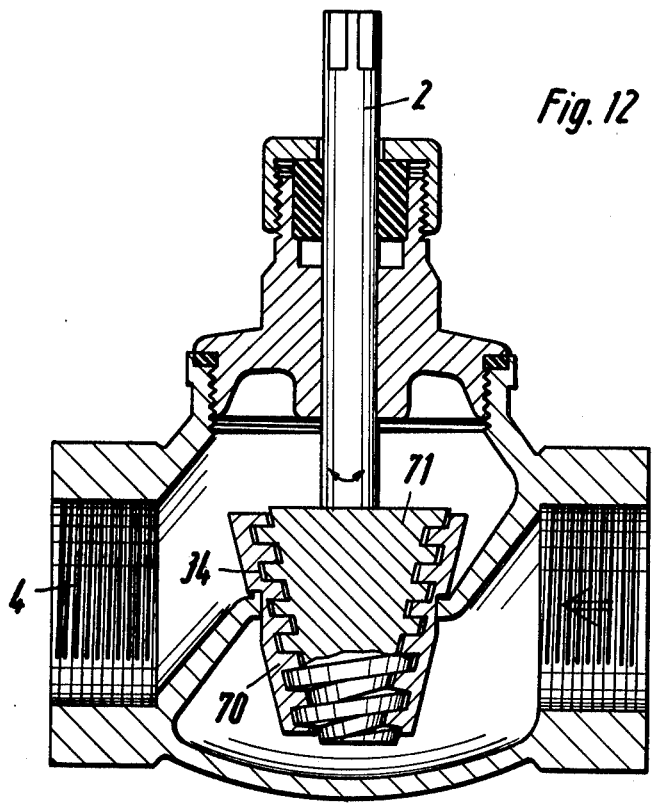
FIG. 12 shows an axial section a valve embodying the invention.

FIG. 12 illustrates a further embodiment of the invention incorporated in a valve. The valve seat in this embodiment is replaced by a hollow conical member 70 having an internal thread into which a frusto-conical central body 71 is threaded which is provided with external threads for this purpose. A variation of the flow-through cross section is predominantly obtained by increasing the gap width in the spaces between the engaging threads of the members 70 and 71 by turning the member 71 appropriately. A small additional effect in terms of varying the flow resistance is obtained in that, when the member 71 is turned out of the member 70, the length of the helical path which must be traversed by the flowable medium will be decreased. Depending upon the particular applications, the threads may be of the multiple thread type. The valve in FIG. 2 is particularly well suited for regulating the flow of small quantities of flowable medium, since the actual flow-through cross section in relation to the cross section of the member 71 must necessarily be small.

In the embodiments thus far described, the principle of utilizing a small Reynolds number has been employed in such a manner that the throttle resistance which regulates the flow is to be found in the structure 1 itself which produces the effect of the small Reynolds number. However, the principle can also be used in the case of throttling elements in which the actual throttle point is not constructed according to the principle of the small Reynolds number. In such a case a structure having a small Reynolds number is preferably located at the downstream side of the actual regulating device and serves to produce a flow resistance which can prevent the development of unstable flow conditions due to the regulating mechanism, and can frictionally reduce or possibly eliminate other side effects present in the flow of medium. Throttling members which operate according to this principle are preferably characterized in that the structure affording the small Reynolds number does not constitute the primary cause of the flow resistance and is preferably located in those regions of the throttling device which tend to cause turbulence and other non-stationary flow conditions.

The main essential difference in this concept resides in that the structure 1 at the downstream side of the throttling device is substantially thinner than before, and thus offers relatively small specific and absolute flow resistance, serving rather predominantly for a stabilization of the flow conditions. It is frequently advisable in these cases to increase the dimensions of the structure 1 in the direction of flow and to make the structure of fibers, threads or wires in which small diameters can be readily combined with small structural densities. Such structures 1 are preferably located in the regions in which the instability of the flow particularly tends to occur, for example behind the outlet gap of a slide valve, especially in the region in which the slide operates with small outlet gaps, in and at the border where the flowing medium tends to become detached from a surface, and in regions of gas streams where energy fluctuation tends to take place. In many instances it may be advisable to locate the structure offering the small Reynolds number not immediately at the regions having the highest flow speed, because the structure would there be subjected so too strong a wear by the frictional forces, and instead to locate it in the actual range where main and secondary flows become mixed, which usually does not coincide with the range of highest flow speed. It has been observed that in these mixing regions the highest fluctuating energies develop, so that a structure offering a small Reynolds number located in these regions serves particularly effectively to reduce noise levels. It follows from the above that the structure of small Reynolds number need not always fill the entire flow-through cross section, but that it can also be advantageous if the structure is located only in portions of the flow-through cross section.

It is also possible to produce a small flow resistance by installing a structure offering a small Reynolds number downstream of a location in the flow passage in which changes in flow conditions tend to occur. This will lead to a pressure increase in the region located ahead of this flow passage location and tend to eliminate possible fluctuations. An important application of this is for example the development of a small flow resistance due to installation of a structure having a small Reynolds number downstream of a location at which the flow of medium has become detached from the walls bounding the flow channel. This flow resistance causes the flow to spread out and to re-adhere to the wall. In the embodiment shown in FIG. 62 similar in construction to FIG. 36 the wedge-shaped gaps between the dished springs are filled with a structure 1 resulting in a small Reynolds-number. The compression of the wedge-shaped structure 1 is limited by the spacer-rings 70 which are placed between the dished springs 39 at their inner circumferences. By means of this arrangement of the structure 1 its density is constant in space in every position. For the flow of gases an especially desirable constant or decreasing magnitude of the pressure gradient along the structure is realized by means of such a structure 1 having an increasing cross section in the flow direction.

In FIG. 64 is shown an embodiment in which a structure 1, having streamwise varying characteristic dimensions, is located within the tube 4. By means of a streamwise-decreasing flow resistance along the structure a decreasing pressure gradient in flow direction can be realized, so that the exit velocity even in the case of a gas is diminished. A pressure-exerting device 2 serves to compress the structure 1 in a direction inclined to the flow, serving to maintain the similarity of the variation of resistance in the streamwise direction.

FIG. 13 illustrates an exemplary embodiment which is characteristic of the manner in which this second concept of the invention can be employed. The embodiment in FIG. 13 is particularly suitable where the pressure gradient at the outflow side of two slidable valve plates 24 which define with one another the regulating flow-through cross section, it cannot be reduced to the necessary small values due to the prevailing pressures and dimensions. Downstream of the plates 24 there is located a nozzle 28 having a diverging wall. By producing a suction in this wall due to a connection of the interior of the housing 11 with a suction source, or by blowing a pressure medium from a pressure source through the wall, a detachment of the stream of flowing medium from the wall of the nozzle 28 can be avoided, and the development of unstable turbulent flow conditions can be prevented. The non-stationary behavior of gas streams can also be stabilized by such an arrangement, in which case suction will preferably be employed. FIG. 13 shows that a rectangular gap is formed between the plates 24, and that the nozzle 28 can be composed of two elastically deformable apertured or porous walls the upstream ends of which are connected to the plates 24, whereas the downstream ends of the walls are connected to the housing 11. Thus, the walls forming the nozzle 28 move with the plates 24. Of course, a single plate 24 could also be used. The walls of the nozzle 28 are advantageously of apertured sheet material, of wire lattice, of fibrous sliver or other porous structures having an appropriately smooth surface.

Using pressure instead of suction is particularly simple because in most instances the flowable medium itself can be used, branching some of it off ahead of the plate or plates 24 without requiring a special pressure source since the static pressure ahead of the plates 24 is sufficiently high.

In FIGS. 14-35 I have illustrated embodiments which are concerned with the principle of varying the characteristic dimension and or the spatial arrangement of the non-stationary flow volume.

FIG. 14 shows two apertured plates together constituting the structure 34. The plates extend across the flow-through cross section of the pipe 4 and one of them can be shifted relative to the other as indicated by the double-headed arrow. When this is done, the extent to which the apertures in the two plates overlap varies, and thus the flow-through cross section and the flow channels defined by these apertures also is changed. The apertures can have different configurations, for instance be circular or slot-shaped. The purpose of the embodiment in FIG. 14 is to split up the single flow of medium into a plurality of individual branch flows each defined by two of the overlapping apertures in the two plates, because in this manner the frequencies which are produced are shifted towards the higher end of the scale, and the development of low frequencies is largely avoided due to the surrounding wall of the pipe 4. The individual branch streams further tend to shield one another so that the fluctuating energies which are transmitted to the wall of the pipe 4 are substantially decreased.

FIGS. 15 and 16 show an embodiment using two congruently apertured or slotted plates which together form a structure 34. The illustrated embodiment is particularly simple in structural respects, as the two plates of the structure 34 are arranged coaxially to one another in the pipe 4. One of them is stationary and the other is provided with teeth along its periphery so that it can be turned by engagement of these teeth with the illustrated worm. FIG. 16 shows that the turnable plate is mounted on a pin projecting from the stationary plate.

It is clear that by turning the turnable plate to a small extent with reference to the stationary plate, the overlap in the openings of the two plates can be regulated as desired. The characteristic of regulation can be further improved by appropriate dimensioning and shaping of the apertures, which for instance may be teardrop-shaped, slot-shaped, straight or curved, or the like. This improvement is particularly effective for the smaller flow-through cross sections. It is preferred if the apertures or holes become narrower in the direction towards the axis of rotation, as indicated in FIG. 15. The individual rows of holes or apertures are advantageously so arranged as to extend radially of the plates.

The embodiment of FIGS. 15 and 16 could also be modified analogously to the embodiment in FIG. 4, and that a single plate would be arranged eccentrically with reference to the pipe 4 and be provided with apertures analogous to those shown in FIGS. 15 and 16. Conversely, the embodiment in FIG. 4 could be modified analogously to FIGS. 15 and 16, using the two plates of these Figures.

FIGS. 17-19 show a further embodiment of the invention wherein it will be seen that in the flow direction (which is again indicated, as always, by the arrow) of the incoming stream of flowable medium there are spaced one behind the other a plurality of apertured or slotted plates. The apertures or slots are offset relative to one another from plate to plate. The apertures or slots can be offset so far with reference to one another that those of one plate do not at all overlap with those of an axially adjacent plate. It is advantageous if the plates are supported with reference to one another in a resiliently yieldable manner (compare the springs located between them in FIG. 17). By shifting of these plates relative to one another, in which case the spacing between axially successive plates varies, the effective flow-through cross section through the structure 34 composed of these plates, and hence the flow resistance offered by it, can be varied. FIGS. 18 and 19 of course show details of the plates of the structure 34.

The embodiments in FIGS. 14-19 are characterized in that the single stream of flowable medium which normally flows in a valve or the like, is split up into a plurality of individual branch streams of liquid or gas, so that there are smaller mixing regions which produce higher frequencies at a reduced amount of radiated noise, and that these branch streams further tend to shield one another. FIG. 20 shows that the splitting of a stream into a plurality of branch streams can also be obtained in a manner different from that shown with respect to FIGS. 14-19.

In FIG. 20 there is provided a plurality of rings which are stacked axially adjacent one another and which are spaced from one another by interposed springs. Guide posts may be utilized to hold the rings and springs in place, as illustrated. The springs are identified with reference numerals 36, and the rings with reference numeral 35. The arrangement is such that hydrodynamic instabilities are avoided, which will effectively take place as long as the spring forces which stabilize the rings 35 at the selected spacing from one another, and the frictional forces resulting from engagement with the guide posts, are large as compared to the pressures acting upon the individual ring 35. When the stream of flowable medium passes through this structure, as indicated by the arrow, it is split up into individual branch streams which disintegrate in non-correlated manner, produce higher frequencies than the single stream, and thus produce less objectionable noise due to the shift to the higher frequencies. A pressure-exerting arrangement too can be provided by means of which the members 35 can be moved closer together against the force of the springs 36, or are permitted to move apart.

A further embodiment is illustrated in FIGS. 21 and 22 wherein the structure 34 is composed of deformable bands which are arranged at spacing from one another in radial planes and which together form a hollow frusto-conical (or, if preferred, cylindrical) structure 34. The bands are mounted at their left ends, whereas their right ends are connected to a member 24 which can be turned by an exterior handle as indicated by the curved arrow, so that by such turning the size of the flow-through cross sections for the flowable medium is varied. The bands can be supported relative to one another by tensioned elastical spacing rings 36 to obtain hydrodynamic stabilization of the arrangement.

Figure 23:
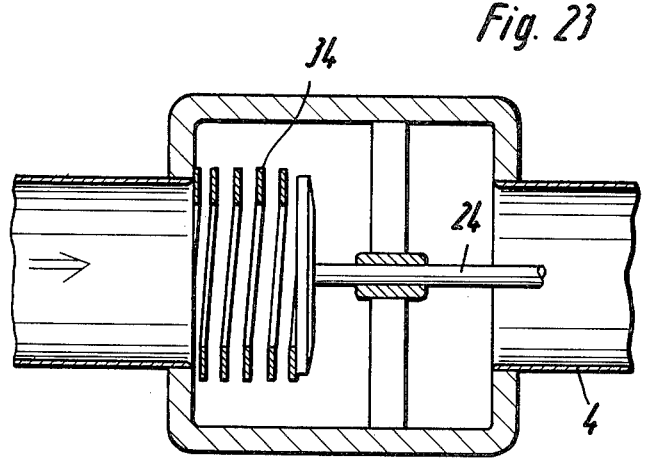
FIG. 23 is a fragmentary axial section illustrating an additional embodiment of the invention.
Figure 24:
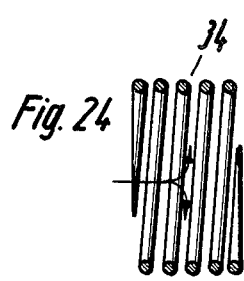
FIGS. 24–32 are fragmentary sections, illustrating details of components which can be used alternatively in the embodiment of FIG. 23.
Figure 25:
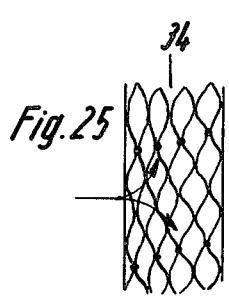
Figure 26:
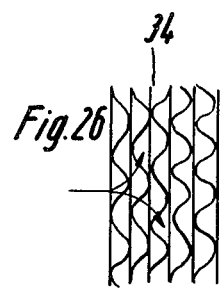
Figure 27:
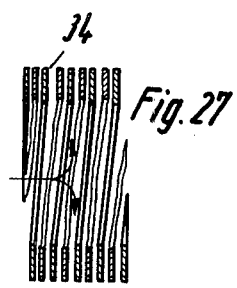
Figure 32:
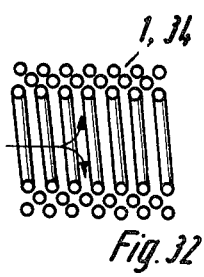

FIGS. 23-34 show embodiments wherein the structure 34 in principle is analogous to that in FIG. 20. FIG. 23 shows the structure 34 mounted opposite the outlet end of the incoming pipe through which the stream of liquid is admitted, and reference numeral 24 identifies an arrangement by means of which the structure 34 can be axially compressed to a greater or lesser degree. The structure 34 in FIG. 23 is a helical spring of flat cross section material, but in its place a helical spring of circular cross section material could be used, such as is illustrated in FIG. 24. FIG. 25 shows a structure 34 wherein a grid is formed of wires or sheet material which are formed to a honeycomb-like structure, with the individual elements being connected at the points of juncture. FIG. 26 shows the structure 34 composed of alternating strips of corrugated and flat sheet material which are welded or otherwise connected to one another. FIG. 27 shows a further spring which is helical and of flat cross-sectioned material, but wherein the material itself is corrugated. When helical springs are used they can be cylindrical or conical, and two or more of them can be concentrically accommodated one inside the other. The springs could also be configured as double or multiple helixes. The structures 34 shown in FIGS. 25 and 26 can, at least in principle, be so finely configured that the principle of the small Reynolds number can be met with the structures, so that here there is in effect a merging between this principle and the principle of splitting the main stream of medium into a plurality of branched streams.

A similar merging of these two principles is obtained by utilizing the helical structures 34 shown in FIGS. 28–32. The structure 34 in FIG. 32 uses a plurality of helical springs which are coaxially threaded into one another. The gaps between the convolutions of each individual one of these springs split the stream and therefore operate according to the principle of splitting the main stream into individual branch streams. The gaps between the convolutions of the adjacent springs, however, meet the requirement enunciated earlier with respect to obtaining the small Reynolds number, so that the structure of FIG. 32 meets both requirements.

Figure 29:
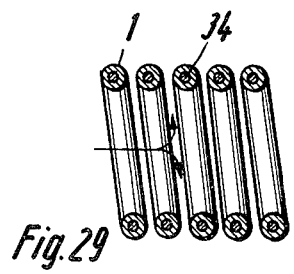
Figure 30:
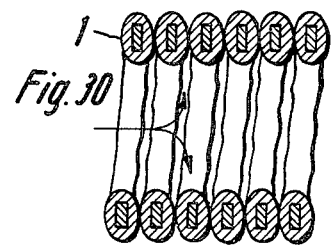

The embodiments of FIGS. 29 and 30 show that the wire-like or strip-like convolutions of a spring are surrounded by a material of small Reynolds number having such a thickness that when the helical spring is not axially compressed, gaps will exist between the material surrounding the successive convolutions which meet the requirement of the principle of splitting the main stream into branch streams. When these springs are actually compressed until the deformable material surrounding their convolutions comes into engagement, the thus modified structure meets the requirements of the small Reynolds number.

Figure 31:
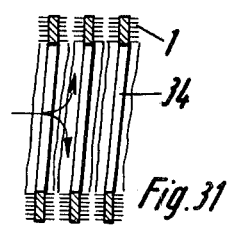

The embodiment in FIG. 31 is somewhat analogous, in that the convolutions of the spring are provided with brush-like or other material having the same purpose as the material surrounding the convolutions of the springs in the embodiments of FIGS. 29 and 30. The operation of the embodiment in FIG. 31 is the same as explained with respect to FIGS. 29 and 30.

Figure 28:
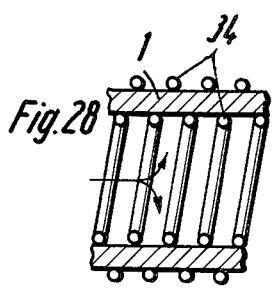

FIG. 28 shows an embodiment wherein the structure 34 utilizes a cylindrically configured helical spring on the inside and another one on the outside of a cylindrically configured structure 1 of small Reynolds number which is permanently arranged in the flow path of the flowable medium. The springs thus serve to split the flow into branch flows, but they could also be merely provided to support the structure 1, or they could be provided to regulate the flow-through cross section by moving their convolutions closer and closer apart until the flow-through cross section is completely blocked by engagement of the convolutions.

In the embodiments of FIGS. 29 and 30 it is also possible to make the convolutions of the springs themselves completely of a material meeting the requirements of the small Reynolds number.

FIG. 33 shows an embodiment wherein a helically configured spring is of conical shape, constituting the structure 34. The spring here is of strip material the plane of which extends normal to the axis of the conical spring. The flow of medium is from the interior of the spring to the exterior as indicated by the curved arrows. The structure 34 in FIG. 33 could also utilize a corrugated spring analogous to the one shown in FIG. 27.

The structure 34 in FIG. 33 could be replaced by the structure 34 shown in FIG. 34 wherein a wire mesh cone is provided as illustrated.

Figure 35:
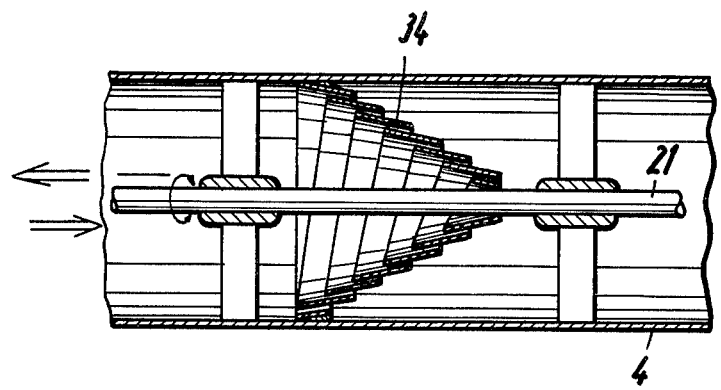
FIG. 35 is an axial section of a further embodiment of the invention.

FIG. 35 shows an embodiment wherein a structure 34 is provided in form of a conically shaped helical spring of strip material, wherein the convolutions of the strip material form with one another gaps for the flowable medium which are either oriented axially or at an angle to the axis of the spring constituting the structure 34. These gaps can be continuously varied by axially compressing or torquing of the spring, and thereby the flow of the medium through these gaps can be regulated. In this embodiment, as in the preceding embodiments using helical springs, hydrodynamic instability must be counteracted by special measures, such as supporting of the convolutions on one another, frictional elements or the like. A particular advantage of the embodiment in FIG. 35, wherein the structure 34 is arranged coaxially to the direction of flow of the medium, is that it operates largely without deflecting the medium from its flow path, so that noises resulting from turbulence caused by such a deflection of the flowing medium are avoided. The two arrows at the left-hand side of FIG. 35 indicate that the flow of the medium can be in one or in the opposite direction in this embodiment.

The embodiments which will be described hereafter are those wherein the constructions involved incorporate structures which meet two or all three of the principles described earlier.

Figures 36, 37:
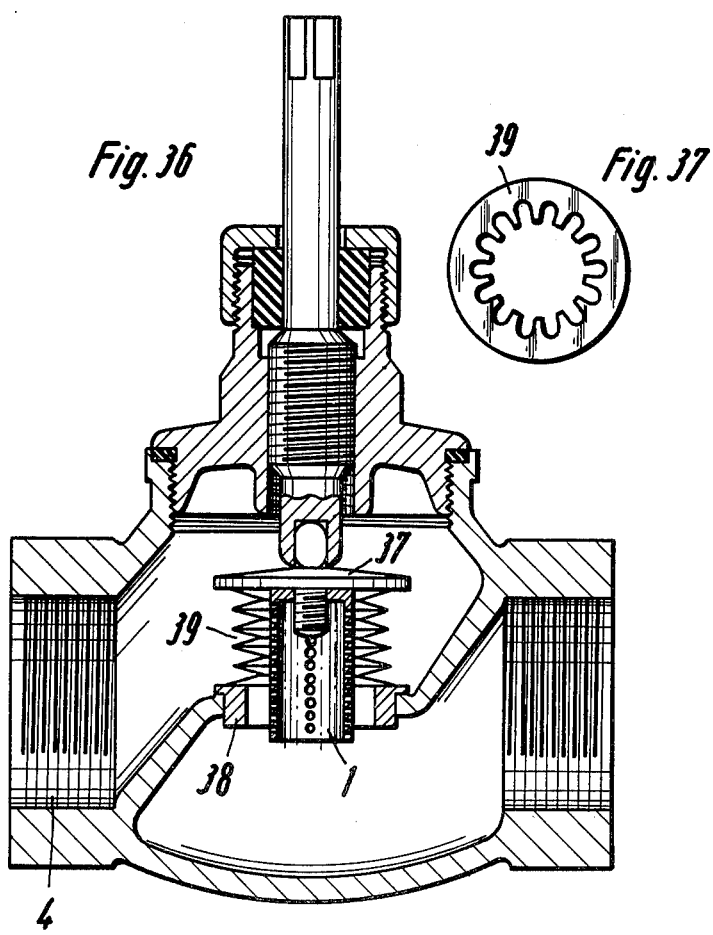
FIG. 36 is an axial section through a valve embodying a further concept of the invention.
FIG. 37 is a plan view showing a detail of one of the components in FIG. 36.

In FIGS. 36 and 37 there is illustrated an embodiment of a valve corresponding in principle to a conventional plate valve. This embodiment, however, incorporates structure which meets all three of the aforementioned principles. In particular, a stack of dished springs is arranged between the valve plate 37 and the valve seat 38. Two consecutive ones of the dished springs always form a pair and have their concave sides facing one another. The inner circumferential edge of each of these springs 39 is slotted as shown in FIG. 37 so that gaps are formed which split the stream of medium into individual branch flows. The wedge-shaped gaps formed by the springs 39 in flow direction behind the gaps through which the medium passes, serve to avoid fluctuations in the flow conditions in that the fine branch flows which are obtained can flow along the surfaces of the springs 39 so that turbulence due to mixing together of the medium of the streams is avoided. Located in the interior of the stack of springs is a hollow cylindrical structure 1 meeting the small Reynolds number requirement; it is secured at the underside of the valve plate 37. This means that the incoming stream of medium is first stabilized according to the principle of the small Reynolds number. The gaps for the medium between the inner edges of the springs 39 can be varied in their width by shifting the valve plate 37 to a greater or lesser degree towards the valve seat 38 in conventional manner, i.e. by turning the valve spindle. More important, however, is the fact that by displacing the valve plate 37 the opening width of the wedge-shaped spaces behind these gaps can be adjusted.

The embodiment in FIGS. 36 and 37 uses a structure 34 which is rotationally symmetrical. However, this could also be redesigned as a flat structure, for instance by using a plate-like slider in a slide valve. It is also clear that the structure 34 of FIGS. 36 and 37 could extend parallel to the flow of medium, rather than across the flow as in FIGS. 36 and 37.

The embodiment of FIGS. 36 and 37 further involves still a fourth effect which heretofore has not been described, but which will now be explained on hand of this example. The energy produced in the wedge-shaped spaces between the springs 35, by the fine branch flows which issue from the flow through gaps, and which energy is produced by the turbulence of admixture, is directly transmitted to the surrounding walls, that is here to the springs 39. Due to the fact that the material of the springs has a certain damping effect, it is possible to converge the thus-produced energies at a early stage into thermal energy, so that it does not even become transmitted to the surrounding liquid volume and thereby to the surrounding housing of the valve. In many instances it is also possible to utilize friction effects at the surfaces of the springs 39 for this purpose. In addition, a reflection of the sound energy occurs due to the density difference between the flowable medium and the springs 39, which amounts to a damping effect. Thus, sound energy is forced to travel in paths which it would not traverse without the novel structure and, especially if in these paths the energy must travel through strongly turbulent flow, additional damping is obtained. This principle of damping adjacent the point of origin corresponds in essence to the principle of the small Reynolds number and is also utilized in some of the following embodiments, but will not be specifically described therein since it will have been understood from the description relative to FIGS. 36 and 37.

It will be understood that instead of the slots shown on the inner edges of the springs 39 in FIG. 37, it is also possible to provide simple holes or the like. The springs 39 could themselves be configured as structures 1 of small Reynolds number. A bellows-shaped member could be utilized formed of a compressible zigzag folded band composed of a structure 1 of small Reynolds number. In this case it may be advantageous to make the edges where the band is folded in half impermeable to the flowable medium. Before and or particularly behind the band an additional structure of small Reynolds number may be arranged, in order to additionally stabilize the inflowing or outflowing medium.

FIGS. 38 and 39 show a further currently preferred embodiment which also incorporates the first-mentioned three principles. Here, a throttling gap for the medium is formed by a spirally wound hollow body, preferably formed of a double tape the edges of which are welded together and which is identified with reference numeral 40. Hydraulic or pneumatic expansion of the double tape to the form of a curved hollow body permits the cross section of the throttling gap to be varied continuously between a maximum value an a zero value. In the illustrated embodiment the tape 40 has its edges connected and closed by welding and engaged by star-shaped supporting structures 3 the spokes of which are advantageously streamlined. One of the structures 3 is axially shiftable to compensate for the width changes of the tape 40 when the latter is expanded by internal pressure. Located at the center of the spiral is a preferably streamlined central body 41 to which the inner end of the spiral is connected. The convolutions of the spiral become expanded in an approximately lenticular configuration when internal pressure is applied, so that the flow-through gaps between the convolutions form convergent-divergent nozzles. A deformable structure 41 of small Reynolds number, preferably of streamlined configuration, is located at the center of the spiral and has the inner end of the tape 40 of the spiral connected to it. The convolutions of the spiral become expanded in approximately lenticular shape when the interior of the double tape 40 is pressurized by admitting a fluid into it, so that the gaps between the adjacent convolutions then form convergent-divergent nozzles. An additonal deformable structure of small Reynolds number can be accommodated in these gaps between the convolutions of the spiral, and will serve the secondary purpose of stabilizing the spacing between these convolutions, as shown diagrammatically in the two exemplary embodiments illustrated in FIGS. 41 and 42.

The expansible portion of the spiral can be substantially lengthened at the outflow side or downstream side thereof by providing plate-shaped extensions 42 which in the illustrated embodiment are approximately twice as long as the expansible portion of the spiral convolutions. This extension by means of the extensions 42 assures that the principle of preventing certain fluctuations in the flow conditions of the freely flowing medium will operate in this embodiment, because the pressure gradient downstream of the flow-through gaps between the convolutions of the spiral will be distributed over a greater length so that the principle of damping noises proximal to the point of origin, which was explained in connection with the embodiment in FIG. 36, can be particularly effective in the embodiment of FIGS. 38 and 39.

FIG. 40 shows that the extensions 42 may be of a material having a small Reynolds number, and FIG. 41 shows that filaments or foils may be accommodated in the gaps between the adjacent convolutions of the spiral and constitute a structure 1 of small Reynolds number as outlined in connection with the embodiment of FIGS. 38 and 39. FIG. 42 shows that the structure 1 of small Reynolds number can also be of a porous material, for instance an open-synthetic plastic foam material located between the adjacent convolutions of the coil in the gaps formed between these convolutions. FIG. 43 shows that it is also possible to provide the coil with two or more (two shown) outwardly deformable or distendable portions which are arranged spaced from one another in the direction of the medium flow, for example by superimposing two tapes 40 and connecting them with one another at their edges and also intermediate their edges to form two separate compartments. FIG. 43 shows that the cross section of the compartment which is located in downstream direction (the flow is from left to right in FIG. 43) when fully expanded is preferably smaller than that of the compartment in upstream direction.

FIGS. 44 and 45 illustrate an embodiment wherein the principle of splitting the main flow into branch flows is combined with the principle of preventing sudden fluctuations in the flow conditions. In this embodiment I provide a plurality of tubes or hoses 45 which are aranged in the flow passage extending axially of the same and are distributed over the cross section of the flow passage with spacing from one another. The tubes or hoses 45 are distendable and are secured with their opposite ends in apertured plates 46, 47. The opposite ends can extend into appropriate holes in the plates 46, 47 and be sealingly mounted therein, or else they can be sealingly connected to these plates at the non-apertured portions thereof intermediate the apertures. In the first case the flow channels for the medium are formed by the interiors of the respective tubes 45, and a medium can be admitted through the inlet 25 which will compress the tubes 45 by acting upon their exterior. In the second case the flow channels are formed by the spaces between the tubes 45 which communicate with the apertures in the plates 46, 47, and in this case the tubes will be distended by admitting pressure fluid from an appropriate source, for example by means of channels formed in one of the end plates, such as the end plate 47 as is illustrated in FIG. 45, which channels communicate with the interiors of the respective tubes 45. In addition, structures of small Reynolds number can be accommodated in the flow channels for the medium which is to pass through the interiors of the pipes or through the channels formed between the pipes that is the flowable medium that travels in the flow passage. When this is done, a regulation of the flow resistance of the structure having a small Reynolds number can in addition be obtained by changing the volume thereof when pressure is applied in the manner described above. As a modification of FIGS. 44 and 45 it is also possible to have the tubes 45 extend transversely to the axis of the flow passage, rather than having them extend along the axis as shown in these Figures.

FIGS. 46 and 47 show a further embodiment using a spiral 49 through which the medium flows axially, as indicated by the arrow in FIG. 47. As FIG. 46 shows more clearly, the spiral 49 is formed of a convoluted band the inner end of a which is connected to a central body 41 which is preferably of streamlined configuration (compare FIG. 47), and the outer end of which is secured to the inner surface of a surrounding member, for example a cylindrical member. When the cylindrical member is turned by an appropriate drive, for instance by engagement of a gear with teeth formed in the outer circumferential surface of the cylindrical member, as diagrammatically shown in FIGS. 46 and 47, the width of the gaps formed between the convolutions of the spiral 49 can be varied depending upon whether the coil is being tightened or loosened. When the length of the tape which is formed into the coil 49 is appropriately chosen, the effective flow resistance offered by the coil 49 can be varied within a wide range. In this embodiment increasing tightening of the coil and decrease of the gaps between the coil convolutions, will have an effect which in the case of flowing gases or liquids combines the principle of the small Reynolds number with the principle of splitting the main flow into branch flows.

FIGS. 48 and 49 show two currently preferred embodiments of a strip from which the coil 49 can be wound and which affords a supporting action of the adjacent convolutions with reference to one another. Such a supporting action is particularly advantageous because otherwise the width of the gaps between the different convolutions would not be uniform over the entire radius of the coil, and because a hydrodynamic instability of the coil convolutions relative to one another would be possible. FIG. 48 shows that tongues may be stamped out of the strip and bend approximately to the shape shown in FIG. 50 in side view. FIG. 49 shows a differently configurated tongue shape the side view of which is illustrated in FIG. 51. If the tongues are stamped out of the strip, as in these embodiments, it is advantageous if the strip is composed of two superimposed layers, so that the tongues of one convolution will engage a continuous non-interrupted surface (furnished by the second layer) in the adjacent convolution against which they abut. However, instead of stamping the tongues out of the strip they could also be provided in form of separate members which are connected to the strip at one of their ends and are then bent out to the configurations shown in FIGS. 50 and 51.

Figure 52:
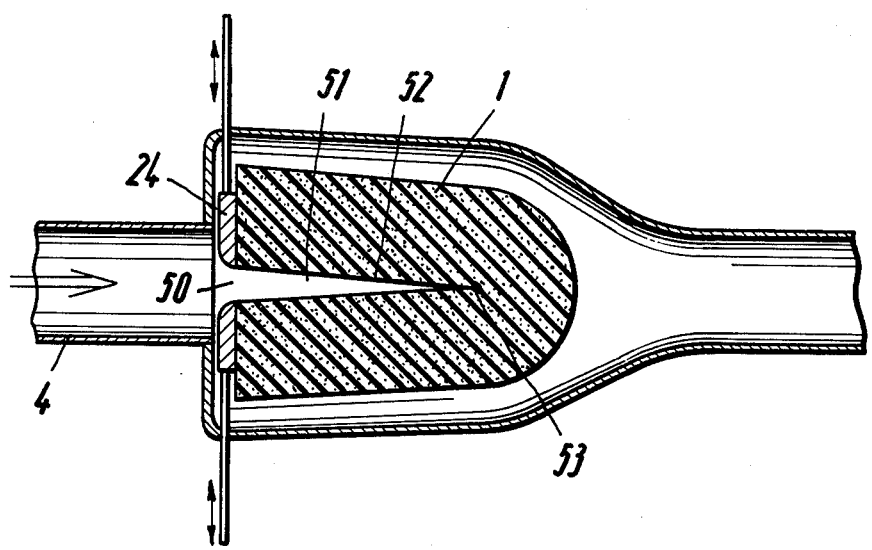
FIG. 52 illustrates another embodiment of the invention in fragmentary axial section.
Figure 61:
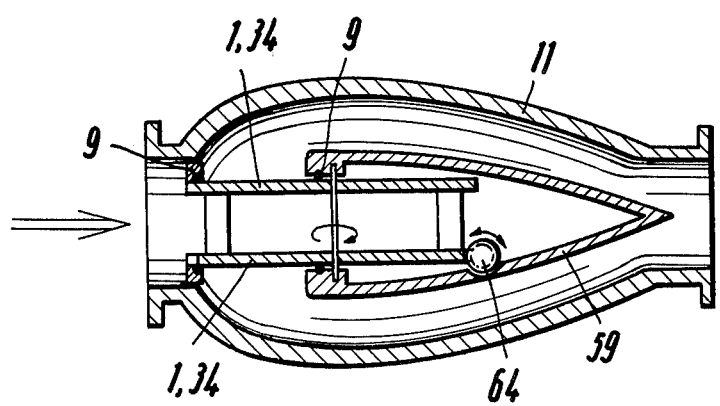
FIG. 61 is an axial section showing still another embodiment of the invention.

FIG. 52 shows an embodiment of the invention which combines the principle of avoiding sudden fluctuations in the flow conditions of the flowable medium, and the principle of the small Reynolds number. The flowable medium travels through the pipe 4 in the direction of the arrow and reaches the inlet end 50 of a throttling gap which converges in wedge-shaped manner in the region 51. The gap 50, 51 is bounded by walls 52 through which the flowable medium can pass to enter into a structure 1 of small Reynolds number, that is one of the structures which have been described earlier as suitable for this purpose. If the flowable medium is a stream of gas, the structure 1 may have low density and small specific resistance, because it will then only serve to suppress turbulence in the medium as it leaves the gap 51. The regulation of the flow is effected by varying the cross section of the opening 50 of the gap, for which purpose the illustrated sliders are provided which can be moved in the direction of the double-headed arrows. If the flowable medium is a liquid, a substantial pressure reduction in the throttling opening 50 cannot take place. This makes it possible to employ the principle of the small Reynolds number in such a manner that the main flow resistance is offered by the structure 1 itself. This, however, constitutes a substantial reduction in the regulating possibilities, so that the embodiment of FIG. 52 is best suited for use in applications where the flowable medium is a gas. If the embodiment is to be used with liquids, a modification is advisable in which a plurality of openings 50 is closed by a structure having a small Reynolds number, for example analogous to the embodiment in FIGS. 15 and 16. In this case, wedge-shaped regions could be formed as chambers in the structure of small Reynolds number behind the openings 50.

Figure 53:
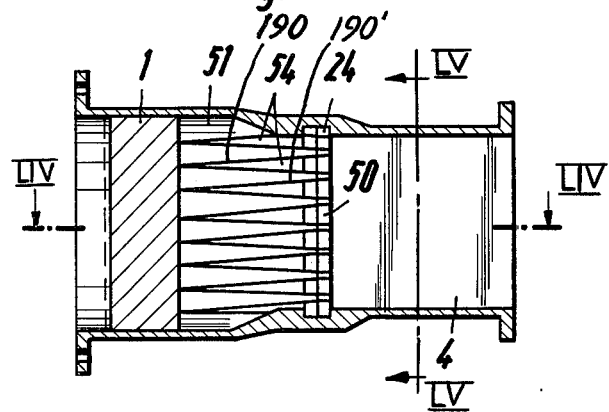
FIG. 53 is a sectional view taken through another embodiment of the invention.
Figure 55:
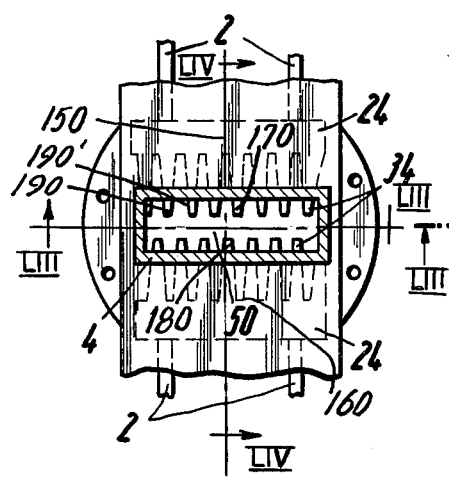
FIG. 55 is still another sectional view of the embodiment of FIG. 53 taken along line LV—LV thereof.
Figure 54:
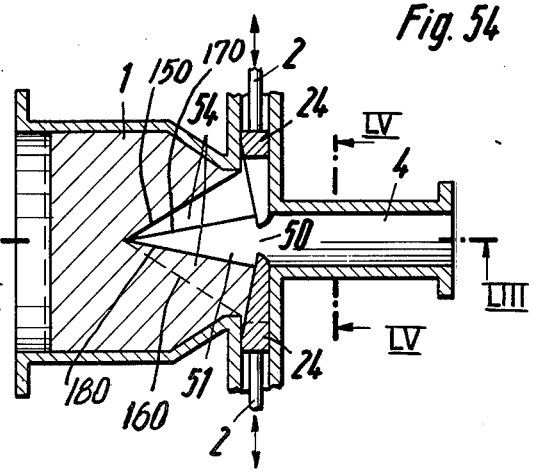
FIG. 54 is another sectional view of the embodiment of FIG. 53 taken along line LIV—LIV thereof.

The cross section of the opening 50 in FIG. 52 is controlled by the movement of the sliders 24, as mentioned before. The inlet cross section of the gap 51 corresponds preferably to the cross section of the opening 50, for which purpose the walls 52 bounding the gap 51 may be made of an appropriate tape or the like of material that is permeable to the flowing medium, and the free ends of the tape may be connected to the sliders 24 so that they move with the movement of the sliders. The other ends of the tape are then connected at 53 to one another and, if desired, they may be connected to a pin or the like which serves as a pivot. If the tape is relatively rigid and for instance apertured, then movement of the walls 52 apart from one another will tend to compress the material of the structure 1. The structure 1 itself could also be connected to the juxtaposed sides of the sliders 24, in which case separate tapes or walls 52 for the gap 51 could be omitted. FIGS. 53–55 illustrate an embodiment which basically corresponds to that shown in FIG. 52 and which offers in effect the same advantages. However, in FIGS. 53–55 additional steps have been taken to assure that the flowable medium will be split into branch flows in the opening 50. For this purpose the plates 24 are each provided with a plurality of wedge-shaped teeth which are so arranged that the teeth of one plate 24 can move into spaces between the teeth of the other plate 24, and vice versa. Each tooth on upper plate 24 has a root portion 150 and a head portion 170; each tooth on lower plate 24 has a root portion 160 and a head portion 180. Thus, the throttling cross section or opening 50 can be regulated as to its cross section and extends transversely to the flow direction in an approximately meander-shaped configuration, so that in effect a flow gap having a large total width is present. The flowable medium passing through this gap is actually not separated into individual branch flows, but there is a significant variation of the critical dimension of the main stream as the latter travels through the flow gap, and the effect obtained is analogous to that of splitting the main stream into branch streams.

FIG. 53 shows that the wedge-shaped gap 51 located downstream of the opening 50 is separated according to the shape of the plates 24 into a plurality of gaps 54 which communicate with the gaps between the teeth of the plates 24, each gap being bounded by side portions 190, 190' of the teeth. It is advantageous if the structure is such that the gaps 54 move together with the plates 24, or in response to their movement, so that the dimensions of the main gap 51 vary.

FIGS. 56 and 57 show an embodiment which in principle is also analogous to that in FIG. 52 and wherein the throttling opening 50 is formed between a baffle 55 and a control member 56 which extends into an opening of the baffle and which converges in an axial direction of the pipe or flow passage. A structure 1 of small Reynolds number is located axially adjacent the baffle 53 and is formed at the side facing the baffle with a wedge-shaped gap 51 facing the opening of the baffle. FIG. 57 shows that the member 56, the opening of the baffle 55 and the gap 51 have a star-shaped cross section, so that the throttle cross section in this embodiment is also formed of a relatively narrow gap having a large total length in direction transversely of the flow passage.

The increase of this length, and therefore a reduction of the characteristic dimension of the stream of flowing medium at unchanged flow per unit of time can be obtained by modifying the structures in FIGS. 52 and 53–55. In particular, it is possible to use two or more such structures in succession. The embodiment of FIGS. 56 and 57, using the regulating member 56, is particularly advantageous. The baffle 55 may be provided with a plurality of openings each of which has a member 56 associated with it, in which case the members 56 will all be jointly shifted relative to their respective openings, although it is of course also possible to provide an arrangement wherein each of the members 56, or two or more together, would be shifted separately, e.g. by shifting pin 56', which is connected to member 56 and which extends through a slot 56" formed in the pipe 4, in either direction of the double-headed arrow 56"'.

It is clear that the present invention can be utilized in many applications. The various embodiments can themselves be used as throttling devices, or they can be used to prevent unstable flow conditions of a flowing medium, or to convert these into flow conditions which are less objectionable. They can, of course, be added in a relatively simple manner to existing equipment and serve not only to eliminate or suppress undesired noises, particularly disadvantageous or undesired vibrations and noises in new equipment or in equipment to which they are subsequently added. In many instances, two or more of the devices may be combined with one another to obtain the desired result, and various of the disclosed embodiments may for instance be incorporated in multiple-way valves or the like.

It will be appreciated that various of the disclosed embodiments tend to become clogged by contaminant particles that may be carried in the flowable medium. However, where this problem exists a different embodiment may be utilized which is not subject to clogging because it has a decided self-cleaning effect, as for example the embodiment in FIG. 46, or again embodiments such as the one shown in FIG. 3 which does not tend to become clogged at all.

A very significant advantage of the devices according to the present invention is to be seen in the excellent regulating capabilities associated with them, and in particular the fact that in almost all embodiments the flow of medium through them is a viscous flow so that particularly in this range the regulation is highly effective.

Particularly if large cross sections are involved and high fluid pressures at the inlet side of the respective device, it is important to so construct the device that if it involves an adjustable element the forces required to effect adjustment of the element should be as small as possible. This is usually done by providing measures which afford pressure compensation, by providing counter forces which tend to compensate the pressures, or by so constructing the arrangement that the pressures of the fluid act more or less normal to the forces required to effect the movement of the movable component. It is also possible to provide measures which decrease the friction of the movable components relative to one another, or which provide a compensation for frictional forces. The embodiments of FIGS. 58–61 show possibilities of such constructions.

Figure 58:
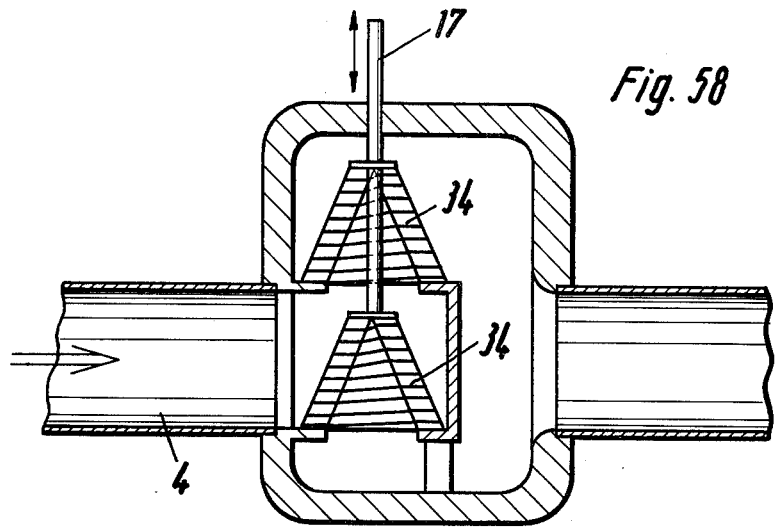
FIG. 58 is a further fragmentary axial section through another embodiment of the invention.

FIG. 58 illustrates an embodiment in which two axially symmetrical structures 34 are mounted on a plunger 17 that is movable as indicated by the double-headed arrow. The flowable medium flowing in the pipe as illustrated by the arrow flows through the one structure 34 from the outside to the inside of the latter, and from the inside to the outside of the other structure 34. However, the embodiment of FIG. 58 could be modified in such a manner that the medium would flow through both of the structures 34 from the interior to the exterior, or from the exterior to the interior. In the illustrated embodiment, and in the possible modifications just mentioned, the pressures acting upon the two structures 34 compensate one another.

Figure 59:
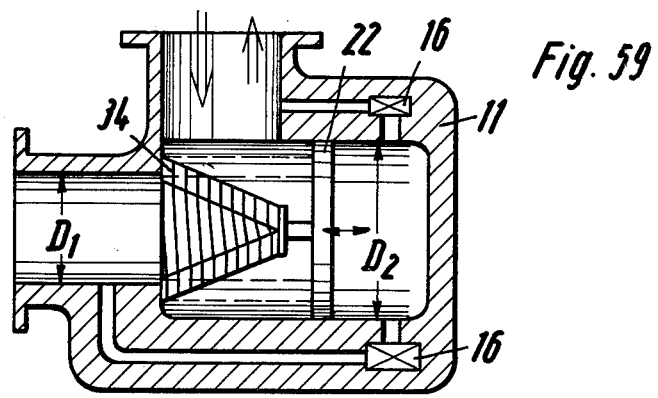
FIG. 59 is also a fragmentary axial section, illustrating still a further embodiment of the invention.

FIG. 59 illustrates a further embodiment using a single conical structure 34 which, as in the case of FIG. 58, may be a helical spring. The base of the structure 34 in FIG. 59 is secured to the housing 11, and the opposite end is connected to a plunger 22. The flowable medium enters the housing 11 in such a manner that it flows towards the structure 34 from the exterior, approximately normal to the axis of the structure. The medium then flows out of the housing in direction coaxially to the structure 34. At the side of the structure 34 which faces away from the outlet of the housing 11 the latter is formed with a chamber in which the plunger 22 is guided for movement as indicated by the double-headed arrow. The diameter $D_2$ of the chamber accommodating the plunger 22 is greater than the diameter $D_1$ of the outlet of the housing from which the fluid exits. The movement of the plunger 22, which acts as a piston, can be effected by applying to the chamber in which it is accommodated, flowable medium via valves 16, which selectively may either be medium at the pressure at which it enters the housing 11, or else it may be some of the medium which is branched off at the outlet side of the housing and which has the pressure prevailing there. Instead of a conical structure 34, it will also be possible to use a cylindrical structure 34, as indicated by the broken lines in FIG. 59.

Figure 60:
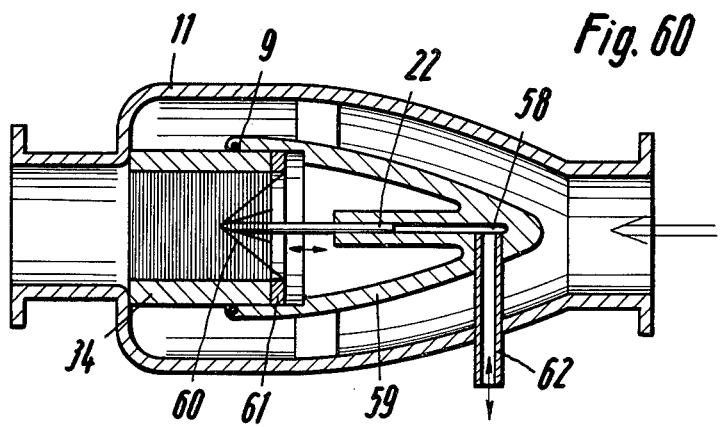
FIG. 60 is an axial section showing an additional embodiment of the invention.

FIG. 60 shows an embodiment wherein the structure 34 is in fact configurated as a hollow cylinder, and wherein the flowable medium flows against the structure 34. The left-hand end face of the structure 34 is supported on the housing 11. The opposite axial end of the structure 34 extends into a cylindrical recess of a member 59 which forms within the housing 11 and with the latter an annular inlet for the incoming flowable medium. The medium flows axially against the member 59 which diverges in its outer diameter in the flow direction of the medium and in a streamlined configuration. A small plunger 22 engages the right-hand end of the structure 34 via radiating ribs 60 and a pressure ring 61, so that the right-hand end is not obstructed. The plunger 22 is guided in a cylinder passage 58 formed in the member 59, and the cylinder passage 58 can be communicated via a nipple 62 with a source of hydraulic or pneumatic pressure fluid. When such fluid is admitted into the passage 58, the structure 34 is compressed by the plunger 22, an effect which is aided by the outlet pressure of the flowable medium which travels radially inwardly through the structure 34 (the latter may again be a helical spring). When pressure fluid is vented from the passage 58, the structure 34 returns to its original position due to its inherent elasticity as a spring.

The embodiment in FIG. 61, finally, again has a housing 11 having axial inlets and outlets for the flowable medium, the direction of flow of which is indicated by the arrow. A hollow member 59 is arranged concentrically in the housing 11 and converges in the direction towards the outlet of the latter. Located in the interior of the member 59 are two plate-shaped structures. They may both be structures 1 of small Reynolds number, they may both be structures 34 or one of them may be a structure 1 and the other may be a structure 34. These structures 1 and/or 34 extend partially out of the member 59 in which they are mounted turnably for rotation about the illustrated axis. Their planes extend parallel to the direction of flow of the incoming stream of flowable medium. Each structure is sealed with respect to the interior of the member 59, that is the outwardly directed surfaces of the respective structures 1, 34 are in engagement with seals 9. Thus, the incoming stream of medium must travel between the structures 1 and/or 34 which are also sealed at their outer circumferences with reference to the housing 11 by means of additional seals 9. Since the flowable medium cannot travel through the member 59 which is impermeable to it, it must travel through the plate members 1 and/or 34 in those regions thereof which are located exteriorly of the member 59, to thereupon flow around the member 59 to the outlet of the housing 11. One of the plates is formed at its outer periphery with an annulus of teeth which are engaged by a worm 64 mounted in the interior of the member 59 so that when the worm 64 is turned from outside the housing 1, the plate will be rotated about the illustrated axis. The other plate is connected via this axis with the turnable plate, so that the two plates will turn in unison and, since different circumferential regions of the plates may have different flow resistances for the flowable medium, the flow resistances can be adjusted by turning the plates 1, 34. In this construction, in which the medium flows through the plates 1, 34 from the inside to the outside of the space surrounded by these plates, any pressures are absorbed within the plates 1, 34 themselves. To increase the stability of the structure, the plates 1, 34 may be connected with one another along their outer circumferences by connecting ribs or the like.

It will be understood that each of the element described above, or two or more together, may also find a useful application in other types of constructions differing from the types described above.

While the invention has been illustrated and described as embodied in flow controlling devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a fluid flow-through device, a combination comprising: first means defining a passage for conducting a stream of a fluid medium of a given kinematic viscosity $v$ though the device; second means communicating with said first means and being disposed to impart fluctuations to said stream; and third means for controlling the flow characteristics of the medium to supress fluctuations in the stream, said third means including a first structure arranged within said passage downstream of said second means, said structure being permeable to the fluid medium and defining in its upstream portion a channel converging in the flow direction, a portion of said first structure surrounding said channel having a plurality of pairs of surfaces past which the medium flows at a speed $u$, said surfaces extending transversely with respect to the direction of flow, the surface in each pair being spaced from each other at a distance $d$ which is determinative of the flow characteristics of the medium, said third means being operative for maintaining the Reynolds number $Re = ud/v$ below $10^3$.

2. A combination as defined in claim 1, wherein said second means is a throttle opening, said third means including a second structure having a pair of juxtaposed plates each formed with a row of wedge-shaped teeth disposed in said throttle opening upstream of said first structure, and spaced in direction transversely of said throttle opening, and means for moving said plates towards and away from each other so as to vary area of said throttle opening.

3. A combination as defined in claim 2, wherein one of said plates has a first row of teeth defining spaces between successive ones of the latter, and wherein the other of said plates as a second row of teeth offset from said first row so as to be received in said spaces of said first row when said varying means moves said plates towards each other.

4. A combination as defined in claim 1, wherein said first structure comprises a plurality of transverse portions extending between the two surfaces of each pair so that the medium flows around said transverse portions.

5. A combination as defined in claim 1, wherein said two surfaces of each pair bound respective flow-through openings in said first structure.

6. A combination as defined in claim 1, wherein said distance d is selected to produce in the flowing medium a Reynolds number $Re = ud/v$ which is on the order of 1.

7. A combination as defined in claim 1, wherein said third means comprises means for splitting said stream into a plurality of individual branch flows causing vibration frequencies which are acceptably different from the vibration frequency caused by said stream prior to such splitting.

8. A combination as defined in claim 1, wherein said second structure is an element of open-celled material.

9. A combination as defined in claim 8, wherein said material is a sinter material.

10. A combination as defined in claim 1, wherein said first structure comprises an element of fibrous wadding.

11. A combination as defined in claim 1, wherein said first structure comprises an element made of apertured material.

12. A combination as defined in claim 1, wherein said third means comprises a flow nozzle arranged in said flow passage and forming a flow path which is bounded by a circumferential surface and includes an inflow section and an outflow section which diverges continuously in the flow direction of said medium; and further comprising a suction source for exerting suction on said medium so as to cause the latter to adhere to said circumferential surface and flow along the same.

13. A combination as defined in claim 1, wherein said control means comprises a flow nozzle arranged in said flow passage and forming a flow path which is bounded by a circumferential surface and includes an inflow section and an outflow section which diverges continuously in the flow direction of said medium; and further comprising a pressure source for exerting pressure on said medium so as to cause the latter to adhere to said circumferential surface and flow along the same.

14. A combination as defined in claim 1, wherein said first structure comprises an element made of strand-shaped material.

15. A combination as defined in claim 1, and further comprising varying means for varying said distance.

16. A combination as defined in claim 15, wherein said first structure is deformable; and wherein said varying means is operative for effecting such deformation.

17. A combination as defined in claim 15, wherein said third means has a total cross-sectional flow-through area for said medium, and said varying means is operative for varying said total cross-sectional area.

18. A combination as defined in claim 1, wherein said first structure is composed of a plurality of individual parts which are each separately movable relative to said passage.

19. A combination as defined in claim 1, wherein said third means further comprises another structure composed of a plurality of connected arcuate elements which form with one another gaps for the flow of said medium.

20. A combination as defined in claim 1, wherein said third means further comprises another structure configurated as a spiral coil of tape material so positioned that said medium flows axially through said spiral coil.

21. A combination as defined in claim 20, wherein said spiral coil is formed of two elastically distendable superimposed tapes which are connected along their respective longitudinal edges to form an enclosed interior space; and a source of pressure medium connected with said space.

22. A combination as defined in claim 21, wherein said spiral coil has its interior space subdivided into a plurality of chambers which are arranged successively along the longitudinal axis of said spiral coil.

23. A combination as defined in claim 20, wherein said tape material has an inner end and an outer end, one of said ends being immovable and the other of said ends being movable circumferentially of said coil to tighten or loosen the latter.

24. A combination as defined in claim 1, wherein said mechanical structure has at least one elastically yieldable tube defining in said passage a flow-through cross-section which varies in response to elastic yielding of the tube wall upon application thereto of requisite pressure.

25. A combination as defined in claim 24, wherein said tube is of substantially lenticular cross-section.

26. A combination as defined in claim 25, wherein said cross-section of said tube has one edge facing in the flow-direction of said medium; and wherein said other structure comprises plate-like extension portions projecting from said one edge.

27. A combination as defined in claim 1, wherein said third means further comprises another structure which forms a plurality of wedge-shaped compartments through which said medium flows, alternate ones of said compartments having their wedge-shaped interiors respectively converging and diverging in the flow-direction of said flowable medium.

28. A combination as defined in claim 27, wherein said compartments are formed at least in the region of their narrowest cross section with gaps communicating with the exterior of the respective compartment.

29. A combination as defined in claim 27, wherein said other structure comprises a stack of dished springs each having a concave side, said dished springs being arranged in pairs of springs which have their dished sides facing one another and form said compartments, and said medium flowing through said stack in direction from the center thereof in radially outward direction.

30. A combination as defined in claim 29, wherein said dished springs each have a central opening and a plurality of slots radiating outwardly from said center opening.

31. A combination as defined in claim 27, wherein said third means further comprises an additional structure located in said passage and having dimensions selected to produce in the flowing medium a Reynolds number which is smaller than $10^4$.

32. A combination as claimed in claim 1, wherein said first structure is located in a downstream diverging part of said passage.

33. A combination as defined in claim 1, wherein said second means has a throttle opening formed with a length dimension and a width dimension, and further comprising varying means for varying at least one of said dimensions.

34. A combination as defined in claim 33, wherein said channel converges in downstream direction towards a point.

35. A combination as defined in claim 1, wherein said second structure comprises a control member extending into said wedge-shaped channel and converging in downstream direction so as to form a throttle opening.

36. A combination as defined in claim 35, and further comprising means for moving said control member towards and away from said first structure so as to vary the size of said throttle opening.

37. A combination as defined in claim 35, wherein said control member has a star-shaped cross-sectional configuration in said converging channel in direction transverse to the downstream direction.

38. A combination as defined in claim 35, wherein the cross-sectional configuration of said control member corresponds to the cross-sectional configuration of said converging channel.

39. A combination as claimed in claim 1, wherein said first structure is composed of a plurality of parts arranged in a sequence in the flow direction, said distance being different for each of said parts.

* * * * *